United States Patent
Jung et al.

(10) Patent No.: US 11,606,830 B2
(45) Date of Patent: Mar. 14, 2023

(54) ELECTRONIC APPARATUS FOR MANAGING NETWORK CONNECTION AND CONTROL METHOD THEREOF

(71) Applicant: Samsung Electronics Co., Ltd., Suwon-si (KR)

(72) Inventors: Rami Jung, Suwon-si (KR); Dongseop Lee, Suwon-si (KR); Seongkyu Song, Suwon-si (KR); Minkyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 16/806,098

(22) Filed: Mar. 2, 2020

(65) Prior Publication Data

US 2021/0105848 A1    Apr. 8, 2021

(30) Foreign Application Priority Data

Oct. 8, 2019    (KR) .......................... 10-2019-0124702

(51) Int. Cl.
*H04W 76/19*    (2018.01)
*G06N 5/04*    (2006.01)
(Continued)

(52) U.S. Cl.
CPC .............. *H04W 76/19* (2018.02); *G06N 5/04* (2013.01); *G06N 20/00* (2019.01); *G06N 3/04* (2013.01)

(58) Field of Classification Search
CPC ..... H04W 76/19; H04W 76/14; H04W 88/04; H04W 16/225; G06N 5/04; G06N 20/00;
(Continued)

(56) References Cited

U.S. PATENT DOCUMENTS 9,572,080 B1    2/2017  Wang et al.
10,142,679 B2 *  11/2018  Koh ..................... H04N 21/251
(Continued)

FOREIGN PATENT DOCUMENTS

JP    2001-136173 A    5/2001
JP    2001136173 A *   5/2001    ............. H04L 12/28
(Continued)

OTHER PUBLICATIONS

International Search Report with Written Opinion dated Jul. 22, 2020; International Appln. No. PCT/KR2020/004907.
(Continued)

*Primary Examiner* — Asghar H Bilgrami
(74) *Attorney, Agent, or Firm* — Jefferson IP Law, LLP

(57) ABSTRACT

An electronic apparatus and a control method are provided. The electronic apparatus includes a transceiver, a memory configured to store an artificial intelligence (AI) model, and a processor configured to control the transceiver to receive environment information from at least one of a plurality of devices that are connected to the electronic apparatus, determine that a predicted device of the plurality of devices will lose a network connection based on the first AI model and the environment information, and in response to determining the predicted device will lose the network connection, maintain the network connection of the predicted device through another device of the plurality of devices. The electronic apparatus may use a rule-based model or an AI model trained by using at least one of a machine learning algorithm, a neural network algorithm, or a deep-learning algorithm.

20 Claims, 33 Drawing Sheets

(51) Int. Cl.
    *G06N 20/00*      (2019.01)
    *H04L 41/0668*    (2022.01)
    *H04L 41/147*     (2022.01)
    *H04L 41/149*     (2022.01)
    *H04L 41/16*      (2022.01)
    *H04L 43/0811*    (2022.01)
    *H04W 76/14*      (2018.01)
    *H04W 88/04*      (2009.01)
    *H04W 16/22*      (2009.01)
    *H04L 41/0631*    (2022.01)
    *G06N 3/04*       (2023.01)

(58) Field of Classification Search
    CPC ....... G06N 3/04; H04L 41/147; H04L 41/064; H04L 41/16; H04L 43/0811
    See application file for complete search history.

(56) References Cited

U.S. PATENT DOCUMENTS

| | | | |
|---|---|---|---|
| 10,602,383 B1* | 3/2020 | Horton | .................. H04W 24/04 |
| 2009/0094484 A1 | 4/2009 | Son et al. | |
| 2014/0376405 A1 | 12/2014 | Erickson et al. | |
| 2015/0289146 A1 | 10/2015 | Ouyang et al. | |
| 2016/0359719 A1* | 12/2016 | Travostino | ............. G06N 20/10 |
| 2017/0206459 A1 | 7/2017 | Kwon | |
| 2017/0264501 A1* | 9/2017 | Mathen | ................... H04L 41/14 |
| 2019/0090246 A1 | 3/2019 | Jagannath et al. | |
| 2019/0101985 A1 | 4/2019 | Sajda et al. | |
| 2019/0116104 A1 | 4/2019 | Mei | |
| 2019/0166534 A1* | 5/2019 | Williammee | ......... H04W 36/14 |
| 2021/0114616 A1* | 4/2021 | Altman | ........... H04W 36/00837 |

FOREIGN PATENT DOCUMENTS

| | | | | |
|---|---|---|---|---|
| JP | 2005-223697 A | | 8/2005 | |
| KR | 10-2006-0133928 A | | 12/2006 | |
| KR | 10-1010217 B1 | | 1/2011 | |
| KR | 10-2013-0085944 A | | 7/2013 | |
| KR | 10-2015-0039198 A | | 4/2015 | |
| KR | 10-1834831 | * | 8/2016 | ............. H04L 12/28 |
| KR | 10-2017-0130817 A | | 11/2017 | |
| KR | 10-1834831 B1 | | 3/2018 | |
| WO | 2011/146831 A1 | | 11/2011 | |
| WO | 2014/011191 A1 | | 1/2014 | |

OTHER PUBLICATIONS

European Search Report dated Jun. 30, 2022; European Appln. No. 20875289.9-1216 / 3981115 PCT/KR2020004907.

* cited by examiner

FIG. 4C

| 410 INPUT | DEVICE 1 | DEVICE 2 | DEVICE A | DEVICE B |
|---|---|---|---|---|
| 9:21 | OPERATION (DEFROST), REMAINING TIME(185s) | SENSING INFORMATION (DOOR IS OPEN) | LOCATION(15, 35), BATTERY(75%) | OPERATION (DEWATERING), COMPLETION RATE(11%) |
| 9:22 | OPERATION (DEFROST), REMAINING TIME(125s) | SENSING INFORMATION (DOOR IS CLOSED) | LOCATION(20, 55), BATTERY(74%) | OPERATION (DEWATERING), COMPLETION RATE(16%) |
| 9:23 | OPERATION (DEFROST), REMAINING TIME(65s) | SENSING INFORMATION (DOOR IS CLOSED) | LOCATION(20, 60), BATTERY(74%) | OPERATION (DEWATERING), COMPLETION RATE(22%) |
| ... | ... | ... | ... | ... |

| 420 OUTPUT | DEVICE 1 | DEVICE 2 | DEVICE A | DEVICE B |
|---|---|---|---|---|
| 9:21 | NETWORK CONNECTION OF DEVICE 1 IS MAINTAINED | NETWORK CONNECTION OF DEVICE 2 IS MAINTAINED | NETWORK CONNECTION OF DEVICE A IS MAINTAINED | NETWORK CONNECTION OF DEVICE B IS MAINTAINED |
| 9:22 | NETWORK CONNECTION OF DEVICE 1 IS MAINTAINED | NETWORK CONNECTION OF DEVICE 2 IS MAINTAINED | NETWORK CONNECTION OF DEVICE A IS MAINTAINED | NETWORK CONNECTION OF DEVICE B IS MAINTAINED |
| 9:23 | NETWORK CONNECTION OF DEVICE 1 IS MAINTAINED | NETWORK CONNECTION OF DEVICE 2 IS MAINTAINED | NETWORK CONNECTION OF DEVICE A IS LOST | NETWORK CONNECTION OF DEVICE B IS MAINTAINED |
| ... | ... | ... | ... | ... |

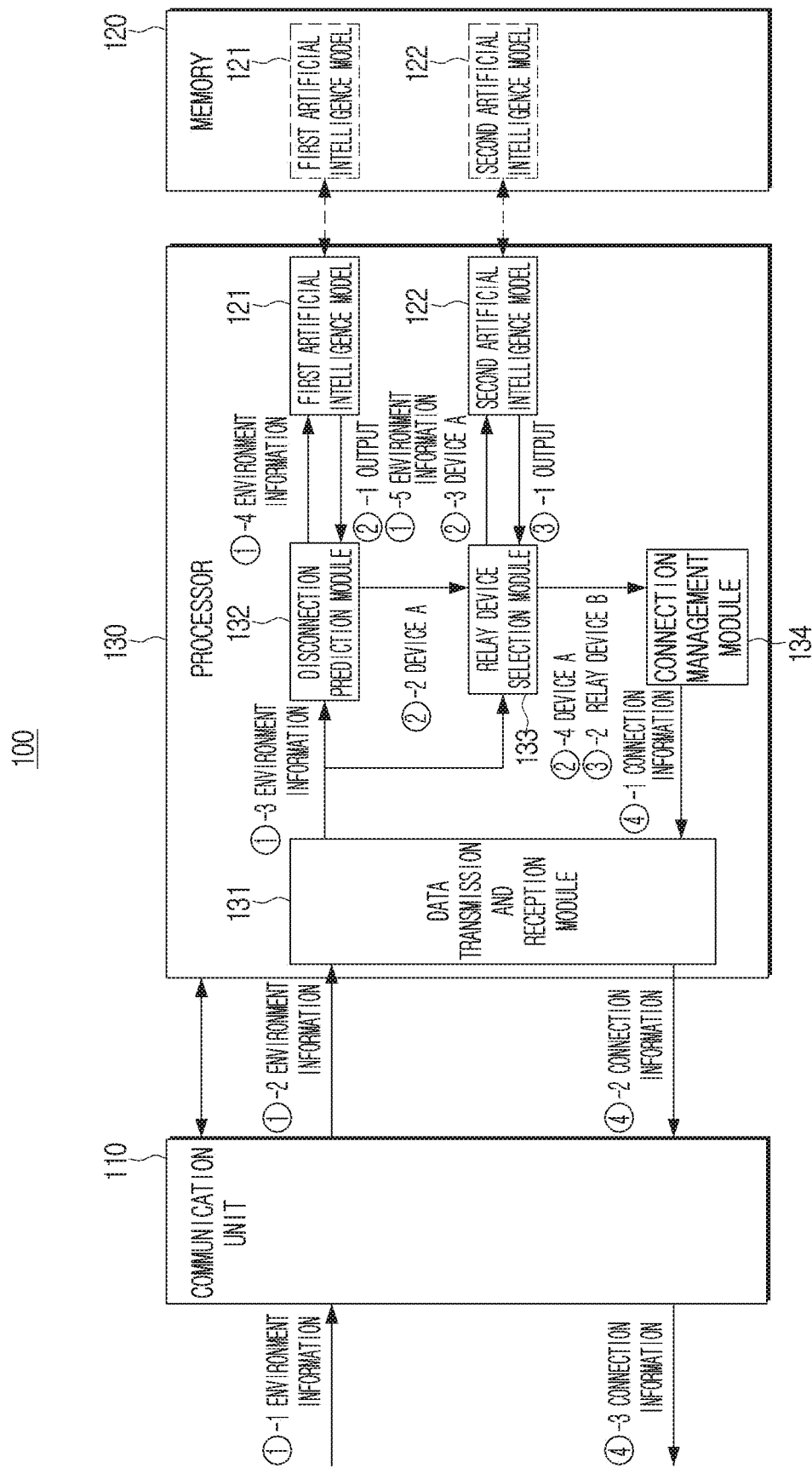

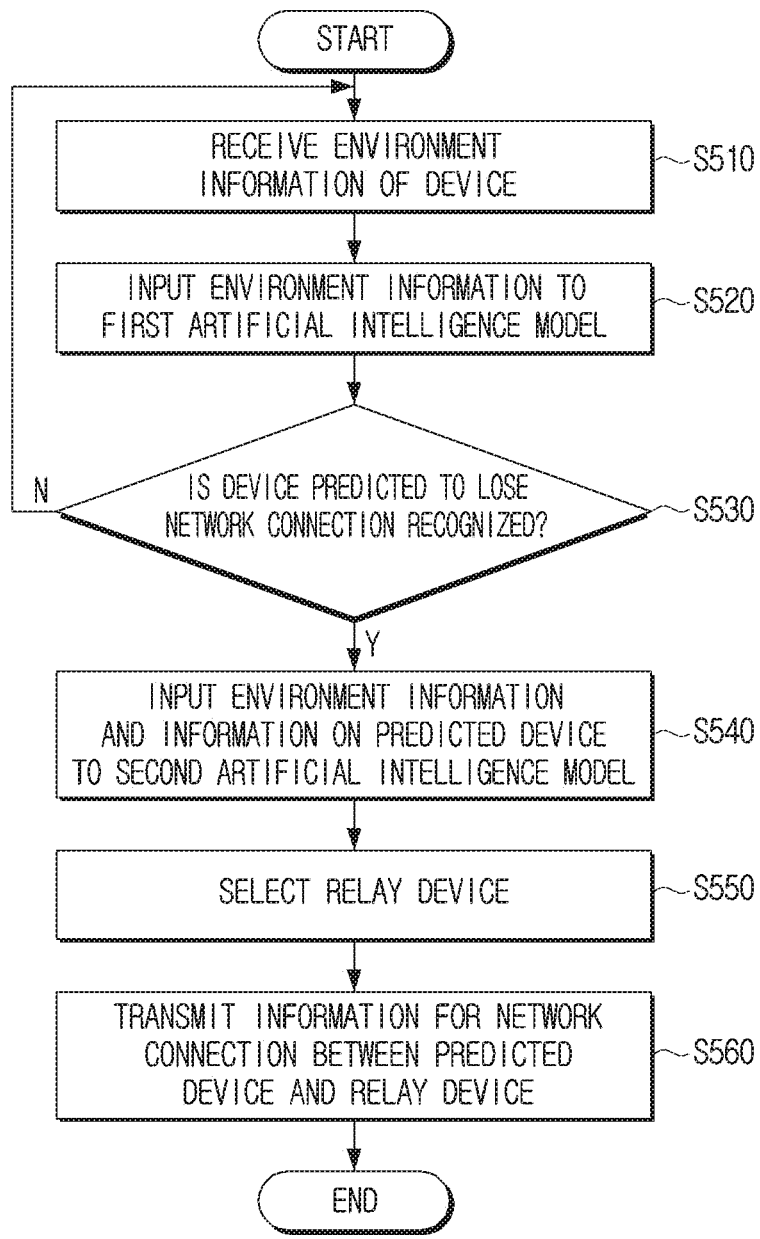

FIG. 5C

| INPUT | DEVICE 1 | DEVICE 2 | ... | DEVICE B |
|---|---|---|---|---|
| 9:21 | LOCATION(10, 80), NETWORK STATE (RSSI -65dBm), OPERATION (ENERGY-SAVING) | LOCATION(150, 20), NETWORK STATE (RSSI -110dBm), OPERATION (DEWATERING), COMPLETION RATE(11%) | | LOCATION(40, 70), NETWORK STATE(RSSI -32dBm) |
| 9:22 | LOCATION(10, 80), NETWORK STATE (RSSI -121dBm), OPERATION (DEFROST), REMAINING TIME(240s) | LOCATION(150, 20), NETWORK STATE (RSSI -121dBm), OPERATION (DEWATERING), COMPLETION RATE(16%) | | LOCATION(40, 70), NETWORK STATE(RSSI -51dBm) |
| 9:23 | LOCATION(10, 80), NETWORK STATE (RSSI -155dBm), OPERATION (DEFROST), REMAINING TIME(180s) | LOCATION(150, 20), NETWORK STATE (RSSI -111dBm), OPERATION (DEWATERING), COMPLETION RATE(20%) | | LOCATION(40, 70), NETWORK STATE(RSSI -53dBm) |
| ... | | | | |

| OUTPUT | DEVICE 1 | DEVICE 2 | ... | DEVICE B |
|---|---|---|---|---|
| 9:21 | NETWORK CONNECTION OF DEVICE 1 MAY BE RELAYED | NETWORK CONNECTION OF DEVICE 2 MAY NOT BE RELAYED | | NETWORK CONNECTION OF DEVICE B MAY BE RELAYED |
| 9:22 | NETWORK CONNECTION OF DEVICE 1 MAY BE RELAYED | NETWORK CONNECTION OF DEVICE 2 MAY NOT BE RELAYED | | NETWORK CONNECTION OF DEVICE B MAY BE RELAYED |
| 9:23 | NETWORK CONNECTION OF DEVICE 1 MAY NOT BE RELAYED | NETWORK CONNECTION OF DEVICE 2 MAY NOT BE RELAYED | | NETWORK CONNECTION OF DEVICE B MAY BE RELAYED |
| ... | | | | |

FIG. 6C

| TIME | OPERATION PROGRESS STATE OF DEVICE X | OPERATION PROGRESS STATE OF DEVICE Y |
|---|---|---|
| 10:23 | OPERATION (AUTOMATIC CLEANING), CURRENT LOCATION(40, 34), MAP DATA, BATTERY LEVEL (48%) | OPERATION (DEWATERING), COMPLETION RATE (0%), OPERATION TIME (0 MINUTES), REMAINING TIME (20 MINUTES) |
| 10:24 | OPERATION (AUTOMATIC CLEANING), CURRENT LOCATION(40, 39), MAP DATA, BATTERY LEVEL (48%) | OPERATION (DEWATERING), COMPLETION RATE (8%), OPERATION TIME (1 MINUTES), REMAINING TIME (19 MINUTES) |
| 10:25 | OPERATION (AUTOMATIC CLEANING), CURRENT LOCATION(44, 38), MAP DATA, BATTERY LEVEL (47%) | OPERATION (DEWATERING), COMPLETION RATE (15%), OPERATION TIME (2 MINUTES), REMAINING TIME (18 MINUTES) |
| ... | ... | ... |

ELECTRONIC APPARATUS FOR MANAGING NETWORK CONNECTION AND CONTROL METHOD THEREOF

CROSS-REFERENCE TO RELATED APPLICATION(S)

This application is based on and claims priority under 35 U.S.C. § 119(a) of a Korean patent application number 10-2019-0124702, filed on Oct. 8, 2019, in the Korean Intellectual Property Office, the disclosure of which is incorporated by reference herein in its entirety.

BACKGROUND

1. Field

The disclosure relates to an electronic apparatus for managing a network connection and a control method thereof. More particularly, the disclosure relates to an electronic apparatus for managing a network connection based on learned information, and a control method thereof.

2. Description of Related Art

Recently, in accordance with the development of electronic technologies, the number of devices with a communication function has rapidly increased. Accordingly, it has become possible to provide information on various network-connected devices to a user or perform a remote control of a network-connected device by the user.

However, in case that a network connection of a device is instable due to an environment (for example, a location, an operation situation, and an external environment) of the device, it is not possible to provide information on the corresponding device to the user or control the corresponding device, which is problematic.

The above information is presented as background information only to assist with an understanding of the disclosure. No determination has been made, and no assertion is made, as to whether any of the above might be applicable as prior art with regard to the disclosure.

SUMMARY

Aspect of the disclosure are to address at least the above-mentioned problems and/or disadvantages and to provide at least the advantages described below. Accordingly, an aspect of the disclosure is to provide an electronic apparatus for managing a network connection, and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a transceiver, a memory configured to store a first artificial intelligence (AI) model, and a processor configured to based on environment information being received from at least one of a plurality of devices that are connected to the electronic apparatus, input the environment information to the first AI model, and in response to one of the plurality of devices being predicted to lose a network connection, maintain the network connection of the predicted device through another device of the plurality of devices.

The processor may be configured to control the transceiver to transmit to the predicted device, a control signal for controlling the predicted device to transmit information obtained by the predicted device to the other device, and may be configured to control the transceiver to transmit, to the other device, a control signal for controlling the other device to transmit the information received from the predicted device to the electronic apparatus.

The processor may be configured to receive, in response to the network connection between the predicted device and the electronic apparatus being lost, the information obtained by the predicted device from the other device via the transceiver.

The first artificial intelligence model may be trained based on training data including information of a device that has lost a network connection to the electronic apparatus among the plurality of devices, and information of the plurality of devices is obtained during a time including a point in time at which the network connection is lost.

The memory may further store a second AI model, and the processor may be further configured to identify the other device based on the second AI model and the environment information.

The second AI model may be trained based on training data including network connection information indicating a state of a network connection between the predicted device and at least one device among the plurality of devices located near the predicted device, and information of the plurality of devices is obtained during a time including a point in time at which the network connection is established.

The memory may further include a third AI model, and the processor may be configured to in case that the other device is not identified, determine prediction information on a future operation progress state of the predicted device based on the third AI model and a current operation progress state of the predicted device, and may be configured to control the transceiver to transmit the prediction information to at least one of the plurality of devices.

The processor may be configured to in response to the network connection between the predicted device and the electronic apparatus being lost and then resumed, receive state information of an operation progress state of the predicted device during a time for which the network connection is lost, from the predicted device via the transceiver, and may be configured to train the third AI model based on the state information.

A communication method between the plurality of devices and the electronic apparatus is different from a communication method between the predicted device and the other device.

The environment information may include at least one of information of an operation progress state of each device, information of a network connection of each device, or information of a surrounding environment of each device.

In accordance with another aspect of the disclosure, a method of an electronic apparatus is provided. The method includes based on environment information being received from at least one of a plurality of devices that are connected to the electronic apparatus, inputting the environment information to a first artificial intelligence (AI) model, and in response to one of the plurality of devices being predicted to lose a network connection, controlling the predicted device to maintain the network connection of the predicted device through another device of the plurality of devices.

The controlling may include transmitting, to the predicted device, a control signal for controlling the predicted device to transmit information obtained by the predicted device to the other device, and transmitting, to the other device, a control signal for controlling the other device to transmit the information received from the predicted device to the electronic apparatus.

The controlling includes receiving, in response to the network connection between the predicted device and the electronic apparatus being lost, the information obtained by the predicted device from the other device.

The first AI model may be trained based on training data including information of a device that has lost a network connection to the electronic apparatus among the plurality of devices, and information of the plurality of devices is obtained during a time including a point in time at which the network connection is lost.

In accordance with another aspect of the disclosure, a control method of an electronic apparatus is provided. The controlling includes inputting the received environment information to a second AI model trained to identify the other device of the plurality of devices network-connected to the electronic apparatus, and identifying the other device based on an output of the second AI model.

The second AI model may be trained based on training data including network connection information indicating a state of a network connection between the predicted device and at least one device located near the predicted device, and information of the plurality of devices is obtained during a time including a point in time at which the network connection is established.

The method may further include in case that the other device is not identified, inputting operation progress state information on a current operation progress state of the predicted device to a third AI model, obtaining prediction information on a future operation progress state of the predicted device based on an output of the third AI model, and transmitting the prediction information to at least one of the plurality of devices.

The method further include in response to the network connection between the predicted device and the electronic apparatus being lost and then resumed, receiving state information of an operation progress state of the predicted device during a time for which the network connection is lost, from the predicted device, and training the third artificial intelligence model based on the state information.

A communication method between the plurality of devices and the electronic apparatus may be different from a communication method between the predicted device and the other device.

The environment information may include at least one of information of an operation progress state of each device, information of a network connection of each device, or information of a surrounding environment of each device.

With the electronic apparatus and the control method thereof according to the disclosure, it is possible to perform automatic network connection management to maintain a network connection of a device that is to lose a network connection.

The electronic apparatus and the control method thereof according to the disclosure may provide prediction information on a device that has lost a network connection. Therefore, it is possible to seamlessly provide information on a device to the user regardless of a loss of the network connection, thereby improving convenience of the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4C is a diagram for describing a method of training a first artificial intelligence model according to an embodiment of the disclosure;

FIG. 5A is a block diagram for describing software components combined with hardware components of an electronic apparatus according to an embodiment of the disclosure;

FIG. 5B is a flowchart for describing operation of an electronic apparatus according to an embodiment of the disclosure;

FIG. 5C is a diagram for describing a method of training a second artificial intelligence model according to an embodiment of the disclosure;

FIG. 6C is a diagram for describing a method of training a third artificial intelligence model according to an embodiment of the disclosure;

Throughout the drawings, like reference numerals will be understood to refer to like parts, components, and structures.

DETAILED DESCRIPTION

Figure 1:
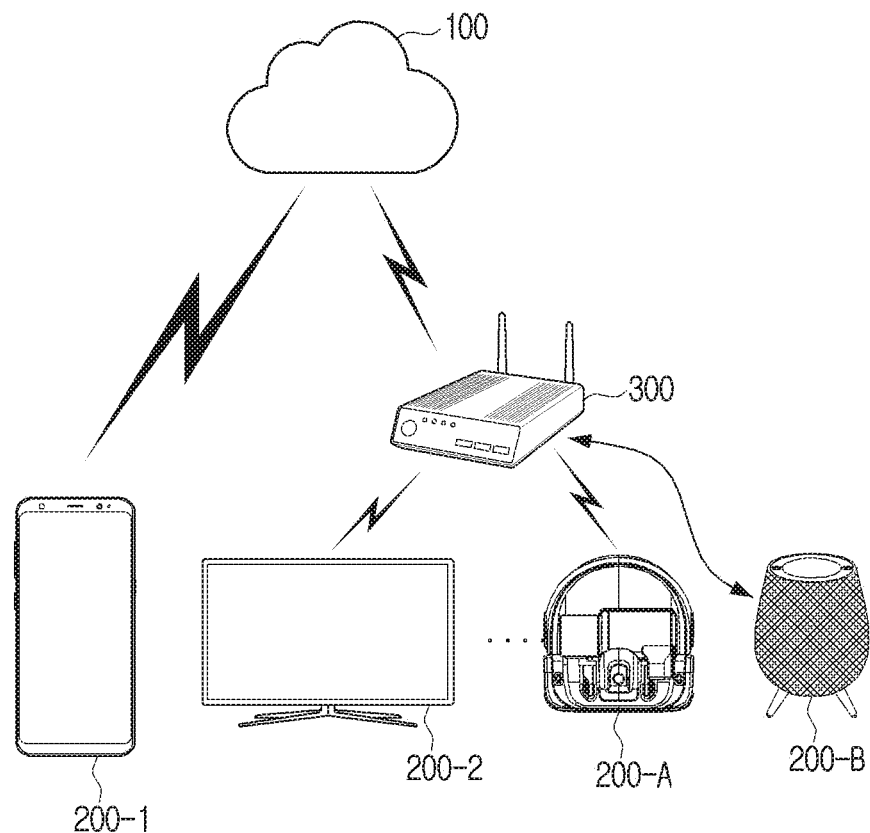
FIG. 1 is a diagram for describing a network system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions "first", "second", or the like, used in the disclosure may indicate various components regardless of a sequence and/or importance of the components, will be used only in order to distinguish one component from the other components, and do not limit the components.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

In the specification, singular forms are intended to include plural forms unless the context clearly indicates otherwise. It will be further understood that terms "include" or "formed of" used in the specification specify the presence of features, numerals, operations, components, parts, or combinations thereof mentioned in the specification, but do not preclude the presence or addition of one or more other features, numerals, operations, components, parts, or combinations thereof.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "a device configured to" may mean that the device may "do" together with other devices or components. For example, a "processor configured (or set) to perform A, B, and C" may mean a dedicated processor (for example, an embedded processor) for performing the operations or a generic-purpose processor (for example, a central processing unit (CPU) or an application processor (AP)) that may perform the operations by executing one or more software programs stored in a memory device.

Hereinafter, various embodiments of the disclosure will be described with reference to the accompanying drawings.

FIG. 1 is a drawing for describing a network system according to an embodiment of the disclosure.

Referring to FIG. 1, a network system 10 may include an electronic apparatus 100 and a plurality of devices 200-1 to 200-B, the electronic apparatus 100 and the plurality of devices 200-1 to 200-B being network-connected to each other.

The network system 10 may refer to a system in which the electronic apparatus 100 and the plurality of devices 200-1 to 200-B network-connected to each other may transmit and receive data to and from each other or may share resources.

The electronic apparatus 100 may refer to a device serving as a manager in the network system 10. For example, the electronic apparatus 100 may control a network-connected device according to a received user command Further, the electronic apparatus 100 may process data received from a network-connected device, analyze information, and display the analyzed information on a screen of the electronic apparatus 100.

To this end, the electronic apparatus 100 may be implemented by a server apparatus (for example, a cloud server). Alternatively, the electronic apparatus 100 may be implemented by various electronic apparatuses such as a smartphone, a tablet personal computer (PC), a wearable device, a PC, a smart television (TV), a smart speaker, an artificial intelligence speaker, an air conditioner, and a refrigerator.

Each of the plurality of devices 200-1 to 200-B may be controlled by the electronic apparatus 100 in the network system 10. Further, each of the plurality of devices 200-1 to 200-B may transmit information thereon to the electronic apparatus 100.

To this end, each of the plurality of devices 200-1 to 200-B may be network-connected to the electronic apparatus 100 through wired communication or wireless communication.

For example, a device 1 (200-1) is a smartphone and may be network-connected to the electronic apparatus 100 through wireless communication such as long-term evolution (LTE), LTE advanced (LTE-A), $5^{th}$ generation (5G) mobile communication, code division multiple access (CDMA), or wideband CDMA (WCDMA). Further, a device 2 (200-2) to a device A (200-A) are network-connected to a bridge apparatus 300 through wireless communication such as wireless fidelity (Wi-Fi), Wi-Fi Direct, Bluetooth, near field communication (NFC), or Zigbee, and a device B (200-B) may be network-connected to the bridge apparatus 300 through wired communication such as Ethernet, optical networking, universal serial bus (USB), or Thunderbolt. Here, the bridge apparatus 300 may be implemented by, for example, an access point, a router, a base station, or an Internet service provider (ISP), and network-connected to the electronic apparatus 100.

According to an embodiment, at least one of the plurality of devices 200-1 to 200-B may control another device in the network system 10 through the electronic apparatus 100, or may receive information on another device through the electronic apparatus 100 and provide the received information to a user. Here, a device performing the above-described operation may be referred to as a master device.

For example, it is assumed that the device 1 (200-1) is the master device. In this case, in response to a user command (for example, user speech or touch input) to cause any one device (for example, the device 2 (200-2)) in the network system 10 to perform a specific operation being received, the device 1 (200-1) may transmit a control signal corresponding to the user command to the device 2 (200-2) through the electronic apparatus 100. Further, the device 2 (200-2) may perform the specific operation according to the received control signal.

Further, in response to information (for example, an operation completion rate) on the device 2 (200-2) being received from the device 2 (200-2), the electronic apparatus 100 may transmit the received information to the device 1 (200-1). In this case, the device 1 (200-1) may receive the information on the device 2 (200-2) from the electronic apparatus 100 and provide the received information to the user. Here, a method of providing the information may include various methods such as displaying the information on the screen as text or images and outputting speech.

Meanwhile, each of the plurality of devices 200-1 to 200-B may be implemented by at least one of a smartphone, a tablet PC, a computer, a smart TV, a smart speaker, an artificial intelligence speaker, an air conditioner, a digital versatile disc (DVD) player, a stereo system, a robotic vacuum cleaner, a vacuum cleaner, an oven, a microwave oven, a washing machine, an air cleaner, a set-top box, a home automation control panel, a security control panel, a TV box (for example, HomeSync™ of Samsung Electronics Co., Ltd, Apple TV™, or Google TV™), a game console (for example Xbox™ or PlayStation™), a medical device, a vehicle, an electronic dictionary, a camcorder, a digital photo frame, a point of sales (POS) of a store, various Internet of Things devices (for example, a bulb, lighting, various types of sensors, an electric or gas meter, a sprinkler, a fire alarm, a thermostat, a street lamp, a toaster, fitness equipment, a hot-water tank, a heater, and a boiler), or a wearable device.

Meanwhile, among the plurality of devices 200-1 to 200-B, a device including a processor (not illustrated) having a predetermined level or more of operation ability may serve as the master device. For example, a smartphone, an artificial intelligence (AI) speaker, or the like may serve as the master device. However, this is only an example, and various modifications are possible.

Meanwhile, the electronic apparatus 100 may predict a device that is to lose a network connection in the network system 10 and maintain a network connection of the predicted device through another device of the plurality of devices 200-1 to 200B.

Further, in case that a network connection of one of the plurality of devices 200-1 to 200-B is lost in the network system 10, the electronic apparatus 100 may provide prediction information about an operation progress state of the device that has lost a network connection. Here, the operation progress state may include at least one of a completion rate (for example, percentage) of an operation in progress, a time for which the operation in progress is performed, or a time remaining until the operation in progress is completed.

Therefore, it is possible to maintain seamless network connectivity of the network, thereby improving user experience and convenience of the user.

Hereinafter, various embodiments of the disclosure will be described in detail with reference to the accompanying drawings.

Figure 2A:
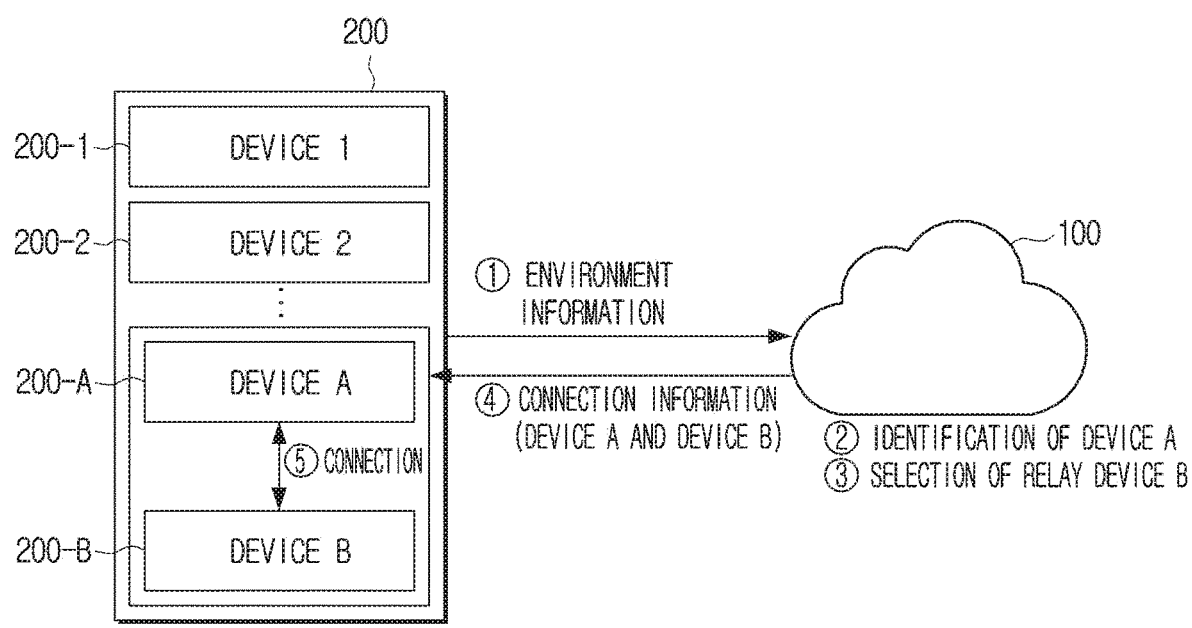
FIG. 2A is a diagram for describing an electronic apparatus according to an embodiment of the disclosure.

FIG. 2A is a diagram for describing an electronic apparatus according to an embodiment of the disclosure.

Referring to FIG. 2A, the electronic apparatus 100 may be network-connected to the plurality of devices 200-1 to 200-B.

In case that at least one (for example, the device A (200-A)) of the plurality of network-connected devices 200-1 to 200-B in the network system 10 is predicted to lose a network connection to the electronic apparatus 100, the electronic apparatus 100 according to an embodiment of the disclosure may maintain a network connection of the predicted device through another device (for example, the device B (200-B)).

Specifically, referring to FIG. 2A, the electronic apparatus 100 may receive information from each of the plurality of network-connected devices 200-1 to 200-B (①of FIG. 2A).

Here, the information may refer to internal environment information or external environment information of each device that may be obtained by each device. Hereinafter, for convenience of explanation, the information will be referred to as environment information. Particularly, the environment information of each device may include at least one of an operation progress state of each device, information regarding a network connection of each device, or information regarding a surrounding environment of each device.

Here, the operation progress state of each device may include at least one of an operation performed by each device, a completion rate (for example, percentage) of the operation, a time for which the operation is performed, a time at which the operation starts, a time at which the operation is to be completed, a current location of each device, a moving direction of each device, a moving speed of each device, or a power status (for example, a battery level or supply of power) of each device.

Further, the information regarding a network connection of each device may include at least one of identification information (for example, a device name, a model number, a serial number, or an Intel Management Engine Interface (IMEI)) of each device, a network address (for example, a media access control (MAC) address or an Internet protocol (IP) address) of each device, a communication method performable by each device, a network state (for example, a receiving sensitivity level or a frequency band) of each device, a power status (for example, a battery level or supply of power) of each device, or a current location of each device.

Further, the information regarding a surrounding environment of each device may include at least one of an ambient temperature of a current location of each device, an image obtained by capturing a surrounding space, signal interference caused by an operation of another device, or various sensing information (for example, whether or not a door is open).

Meanwhile, the environment information may be different for each device. For example, in case that the device 1 (200-1) is a door sensor, environment information of the device 1 (200-1) may be information on whether or not a door is open, and in case that the device 2 (200-2) is a robotic vacuum cleaner, environment information of the device 2 (200-2) may be information on a current location, an operation progress state, or a battery level. Therefore, the electronic apparatus 100 may receive, from the device 1 (200-1), the information on whether or not a door is open, and may receive, from the device 2 (200-2), the information on a current location, an operation progress state, or a battery level of the device 2 (200-2). As such, the environment information received by the electronic apparatus 100 may be different for each device transmitting the environment information.

Further, the electronic apparatus 100 may predict a device that is to lose a network connection, among the plurality of devices 200-1 to 200-B, based on the environment information received from the plurality of devices 200-1 to 200-B. That is, the electronic apparatus 100 may identify a device (for example, the device A (200-A)) predicted to lose a network connection, among the plurality of devices 200-1 to 200-B (②of FIG. 2A).

Here, the device predicted to lose a network connection may refer to a device that currently maintains a network connection but is estimated to be in a state of losing the network connection in the near future in consideration of the operation progress state or surrounding environment of the device. Here, the state of losing the network connection may refer to a state in which two devices may not normally transmit and receive data to and from each other or may not share resources. For example, a state, in which one of two devices transmits a request signal to the other device, but a response signal to the request signal is not received from the other device within a predetermined time or a received signal strength indicator (RSSI) of the received response signal is equal to or lower than a reference value, may be referred to as a state in which a network connection between the two devices is lost.

Further, the electronic apparatus 100 may identify a relay device (for example, the device B (200-B)) that may relay a network connection of the device (for example, the device A (200-A)) predicted to lose a network connection, among the plurality of devices 200-1 to 200-B, based on the environment information received from the plurality of devices 200-1 to 200-B (③ of FIG. 2A).

Here, the relay device may refer to a device that is network-connected to each of two devices and maintains a network connection between the two devices. That is, the relay device may be a device receiving data from one device and transmitting the received data to the other device, and in this case, a path through which the data are transmitted and received may be changed to pass through the relay device.

Further, the electronic apparatus 100 may transmit, to the device (for example, the device A (200-A)) predicted to lose a network connection and the relay device (for example, the device B (200-B)), connection information for a network connection between the device (for example, the device A (200-A)) predicted to lose a network connection and the relay device (for example, the device B (200-B)) (④ of FIG. 2A).

Here, the connection information is information required for one device to be network-connected to another device, and may include a network address (for example, an MAC address or an IP address) of a device to be network-connected, a communication method (for example, Wi-Fi, Bluetooth, ZigBee, or NFC) for the network connection, and the like. Further, the connection information may further include, for example, a command to control a device to establish a communication connection to a communication connection target device according to a specific communication method.

Further, the device (for example, the device A (200-A)) predicted to lose a network connection and the relay device (for example, the device B (200-B)) may establish a network connection between the predicted device A (200-A) and the selected device B (200-B) based on the received connection information. Accordingly, the device (for example, the device A (200-A)) predicted to lose a network connection may maintain a network connection to the electronic apparatus 100 through the relay device (for example, the device B (200-B)) (⑤ of FIG. 2A).

The electronic apparatus 100 according to the disclosure as described above may maintain seamless network connectivity between the electronic apparatus 100 and devices even in case that a network connection of the network-connected devices becomes instable due to various internal or external environmental factors, thereby improving convenience of the user.

Figure 2B:
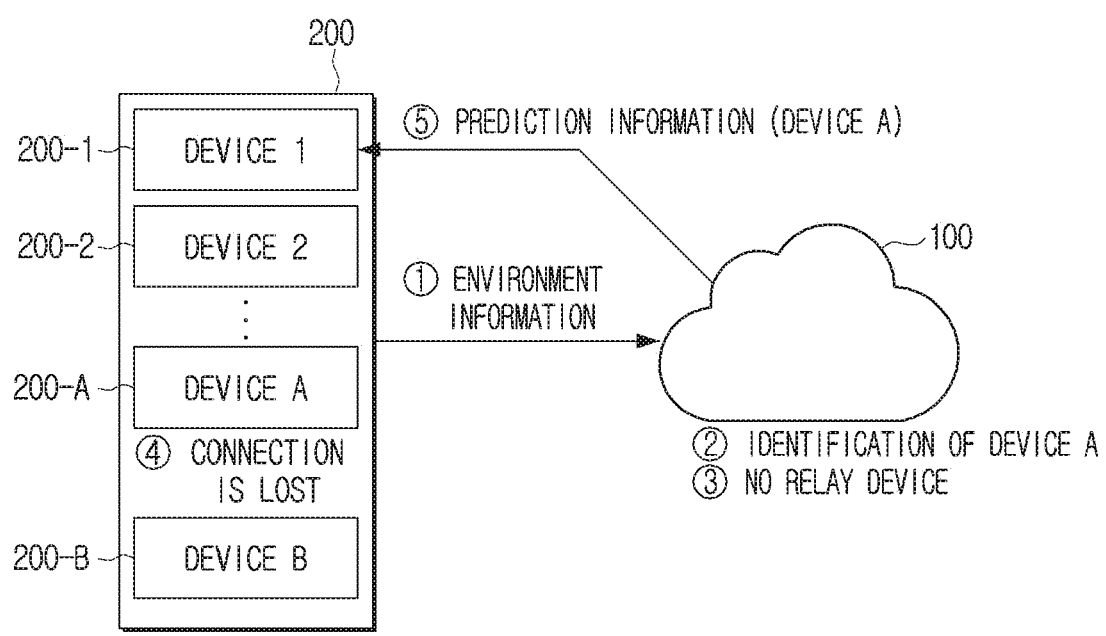
FIG. 2B is a diagram for describing an electronic apparatus according to an embodiment of the disclosure.

FIG. 2B is a diagram for describing an electronic apparatus according to an embodiment of the disclosure.

Referring to FIG. 2B, the electronic apparatus 100 may be network-connected to the plurality of devices 200-1 to 200-B.

In case that a network connection of one of the plurality of devices 200-1 to 200-B is lost in the network system 10, the electronic apparatus 100 according to an embodiment of the disclosure may provide prediction information about an operation progress state of the device that has lost a network connection. Here, the prediction information may refer to information obtained by predicting (or estimating) the operation progress state of the device that has lost a network connection.

Specifically, referring to FIG. 2B, the electronic apparatus 100 may receive information from each of the plurality of network-connected devices 200-1 to 200-B (① of FIG. 2B).

Further, the electronic apparatus 100 may predict a device (for example, the device A (200-A)) that is to lose a network connection, among the plurality of devices 200-1 to 200-B, based on the environment information received from the plurality of devices 200-1 to 200-B (② of FIG. 2B).

Further, the electronic apparatus 100 may identify a relay device that may relay a network connection of the device (for example, the device A (200-A)) predicted to lose a network connection, among the plurality of devices 200-1 to 200-B, based on the environment information received from the plurality of devices 200-1 to 200-B.

Here, in case that there is no relay device that may relay a network connection of the device A (200-A) predicted to lose a network connection unlike the embodiment of FIG. 2A, the electronic apparatus 100 may identify that there is no relay device (③ of FIG. 2B).

Further, in response to a network connection between the device A (200-A) predicted to lose a network connection and the electronic apparatus 100 being lost (④ of FIG. 2B), the electronic apparatus 100 may transmit, to at least one (for example, the device 1 (200-1)) of the plurality of devices 200-1 to 200-B maintaining a network connection, prediction information about an operation progress state of the device (for example, the device A (200-A)) that has lost a network connection (⑤ of FIG. 2B).

In this case, the least one device (for example, the device 1 (200-1)) may provide the prediction information to the user in various manners such as displaying the received prediction information about the operation progress state of the device A (200-A) that has lost a network connection on a screen, or outputting the received prediction information in a form of speech. Here, the device 1 (200-1) may be a master device.

Meanwhile, the device 1 (200-1) may periodically receive information on the operation progress state of the device A (200-A) and provide the information on the operation progress state of the device A (200-A) to the user in various manners, also before the network connection of the device A (200-A) is lost.

The electronic apparatus 100 according to the disclosure as described above may provide, to the user, prediction information about the device A (200-A) after the loss of the network connection, in addition to information on the device A (200-A) before the loss of the network connection, even in case that the network connection of the device A (200-A) is lost, thereby continuously maintaining user experience and improving convenience of the user.

Hereinafter, hardware components and software components according to the disclosure will be described in detail with reference to the accompanying drawings.

Figure 3:
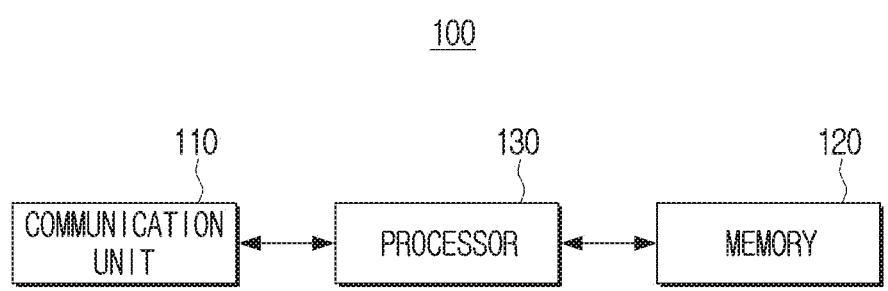
FIG. 3 is a block diagram for describing hardware components of an electronic apparatus according to an embodiment of the disclosure.

FIG. 3 is a block diagram for describing hardware components of an electronic apparatus according to an embodiment of the disclosure.

Referring to FIG. 3, the electronic apparatus 100 may include a communication unit 110, a memory 120, and a processor 130.

The communication unit 110 may refer to a hardware component capable of performing communication with the plurality of devices 200-1 to 200-B (hereinafter, referred to as the plurality of devices 200 for convenience of explanation) to transmit and receive various information (or data).

For instance, the communication unit may be a transceiver capable of bidirectional communication. In another example, the communication unit may be a receiver capable of unidirectional communication. Specifically, the communication unit 110 may receive environment information from the plurality of devices 200, and transmit connection information to at least one of the plurality of devices 200. In this case, the communication unit 110 may transmit and receive various information to and from the plurality of devices 200 by using a communication protocol such as the Transmission Control Protocol/Internet Protocol (TCP/IP), the User Datagram Protocol (UDP), the Hyper Text Transfer Protocol (HTTP), the Secure Hyper Text Transfer Protocol (HTTPS), the File Transfer Protocol (FTP), the Secure File Transfer Protocol (SFTP), or the Message Queuing Telemetry Transport (MQTT).

To this end, the communication unit 110 may be connected to the plurality of devices 200 by a network through wired communication or wireless communication. Here, the network may be a personal area network (PAN), a local area network (LAN), a wide area network (WAN), or the like, based on an area or scale, or may be Intranet, Extranet, Internet, or the like, based on an openness of the network.

Here, the wireless communication may include at least one of communication methods such as LTE, LTE-A, $5^{th}$ generation mobile communication, CDMA, WCDMA, the universal mobile telecommunications system (UMTS), wireless broadband (WiBro), and the Global System for Mobile Communications (GSM), time division multiple access (TDMA), Wi-Fi, Wi-Fi Direct, Bluetooth, NFC, and Zigbee. The wired communication may include at least one of communication methods such as Ethernet, optical networking, USB, and Thunderbolt. Here, the communication unit 110 may include a network interface or a network chip according to the above-described wired or wireless communication method. Meanwhile, the communication method is not limited to the above-described example, and may include communication methods that emerge with the development of technologies.

The memory 120 may refer to a hardware component storing information such as data in an electric form or a magnetic form to allow the processor 130 or the like to access the information. To this end, the memory 120 may be implemented by at least one of hardware such as a non-volatile memory, a volatile memory, a flash memory, a hard disk drive (HDD), a solid state drive (SDD), a random access memory (RAM), or a read only memory (ROM).

The memory 120 may store at least one instruction, module or data required for an operation of the electronic apparatus 100 or the processor 130. Here, the instruction is a symbol unit indicating an operation of the electronic apparatus 100 or the processor 130, and may be written in a machine language which is a language that may be understood by a computer. The module may be an instruction set to perform a specific operation in a work unit. The data may be information in a bit or byte unit, which may indicate characters, numbers, images, or the like.

Further, the memory 120 may store environment information received from the plurality of devices 200. The environment information has been described above. Further, the memory 120 may store an artificial intelligence model (not illustrated) trained to predict a device that is to lose a network connection to the electronic apparatus 100.

Here, the artificial intelligence model may be configured with a plurality of neural network layers. Each of the plurality of neural network layers has a plurality of weight values, and layer calculation is performed by using a calculation result of a previous layer and through calculation using the plurality of weight values. Examples of the neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-network, but are not limited thereto. Further, the artificial intelligence model may also have an ontology-based data structure in which various concepts, conditions, relationships, or consensual knowledge are expressed in a form that can be processed by computers.

The artificial intelligence model may be trained through the electronic apparatus 100 or a separate server or system by using various learning algorithms The learning algorithm is a method in which a predetermined target device (for example, a robot) is trained by using multiple training data to be able to make a decision or perform prediction by itself Examples of the learning algorithm include supervised learning, unsupervised learning, semi-supervised learning, and reinforcement learning, but are not limited thereto.

The memory 120 is accessed by the processor 130, and readout, recording, correction, deletion, update, and the like, of instructions, modules, artificial intelligence models, or data may be performed by the processor 130.

The processor 130 may be configured with one or a plurality of processors, and the processor 130 may be implemented by a general-purpose processor such as a CPU or an AP, a graphics processor such as a graphics processing unit (GPU) or a vision processing unit (VPU), an artificial intelligence processor such as a neural processing unit (NPU), or the like.

The one or plurality of processors perform a control to process input data according to a pre-defined operation rule or an artificial intelligence model stored in the memory 120. The pre-defined operation rule or the artificial intelligence model is obtained through learning.

Here, the obtaining of the pre-defined operation rule or the artificial intelligence model through learning means that a pre-defined operation rule or an artificial intelligence model with desired characteristics is obtained by applying a learning algorithm to multiple training data. Such a learning may be performed by a device in which artificial intelligence is implemented according to the disclosure, or may be performed through a separate server or system.

The processor 130 may control an overall configuration of the electronic apparatus 100.

The processor 130 may input, to a first artificial intelligence model 121 (see FIG. 4A), information received from at least one of the plurality of devices 200 network-connected to the electronic apparatus 100 via the communication unit 110, and in case that one of the plurality of devices 200 is predicted to lose a network connection based on an output of the first artificial intelligence model 121, the processor 130 may perform a control to maintain the network connection of the predicted device through another device of the plurality of devices 200. Here, the other device may mean the relay device.

Specifically, the processor 130 may input, to the first artificial intelligence model 121, information received from at least one of the plurality of devices 200 network-connected to the electronic apparatus 100 via the communication unit 110, and identify a device predicted to lose a network connection among the plurality of devices 200 based on the output of the first artificial intelligence model 121.

Here, the first artificial intelligence model 121 may be a model trained based on training data including information on a device that has lost a network connection to the electronic apparatus 100 among the plurality of devices 200 network-connected to the electronic apparatus 100, and information on the plurality of devices 200 obtained during a time including a point in time at which the network connection is lost. Further, the above description of the artificial intelligence model may be applied to the first artificial intelligence model 121, and the first artificial intelligence model 121 may be stored in the memory 120.

In this case, in case that one of the plurality of devices 200 is predicted to lose a network connection, the processor 130 may perform a control to maintain the network connection of the predicted device through another device of the plurality of devices 200.

Here, a method used for a network connection between the predicted device and the electronic apparatus 100 may be different from a method used for a network connection between the predicted device and the other device. For example, in case that the method used for the network connection between the predicted device and the electronic apparatus 100 is a Wi-Fi method using an AP, the method used for the network connection between the predicted device and the other device may be a Bluetooth method or an NFC method, other than the Wi-Fi method.

To this end, the processor 130 may transmit, to the device (hereinafter, referred to as the predicted device) predicted to lose a network connection via the communication unit 110, a control signal for controlling the predicted device to transmit information obtained by the predicted device to the other device, and may transmit, to the other device via the communication unit 110, a control signal for controlling the other device to transmit the information received from the predicted device to the electronic apparatus 100.

Then, in response to the network connection between the predicted device and the electronic apparatus 100 being lost, the processor 130 may receive the information obtained by the predicted device from the other device via the communication unit 110.

Meanwhile, in case that one of the plurality of devices 200 is predicted to lose a network connection, the processor 130 may identify another device for maintaining the network connection of the predicted device among the plurality of devices 200.

In this case, the processor 130 may input received information on each device to a second artificial intelligence model 122 trained to identify another device of the plurality of devices 200 network-connected to the electronic apparatus 100, and identify another device based on an output of the second artificial intelligence model 122 (see FIG. 5A).

Here, the second artificial intelligence model 122 may be a model trained based on training data including information on a state of communication for a network connection between the predicted device and at least one device located around the predicted device among the plurality of devices 200, and information on the plurality of devices obtained during a time including a point in time at which the network connection is established.

To this end, the memory 120 may further store the second artificial intelligence model 122 trained to identify another device of the plurality of devices 200 network-connected to the electronic apparatus 100. Further, the above description of the artificial intelligence model may be applied to the second artificial intelligence model 122.

Meanwhile, the electronic apparatus 100 according to an embodiment of the disclosure may further include an input interface (not illustrated) and an output interface (not illustrated), in addition to the communication unit 110, the memory 120, and the processor 130.

The input interface may receive various user inputs and transfer the received user inputs to the processor 130. The input interface may include, for example, at least one of a touch panel (not illustrated), a pen sensor (not illustrated), a key (not illustrated), or a microphone (not illustrated). The touch panel may use at least one of, for example, a capacitive manner, a resistive manner, an infrared manner, or an ultrasonic manner, and to this end, the touch panel may include a control circuit. The touch panel may further include a tactile layer to provide a tactile reaction to the user. The pen sensor may be, for example, a part of the touch panel or may include a separate sheet for recognition. The key may be, for example, a physical button, an optical key, or a keypad. The microphone may directly receive user speech and the user speech which is an analog signal may be converted into a digital signal by a digital converter (not illustrated) to obtain an audio signal. Such an input interface may be embedded in the electronic apparatus 100 or may be implemented by a separate external device (not illustrated) such as a keyboard, a mouse, or an external microphone.

The output interface may include at least one of a display (not illustrated) or a speaker (not illustrated). Here, the display is a device outputting information in a visual form (for example, text or images). The display may display an image frame on a part of a display region or the entire display region. The display region may refer to the entire region in a pixel unit, on which information or data are visually displayed. At least a part of the display may be a flexible display and may be coupled in at least one of a front surface region, a side surface region, or a back surface region of the electronic apparatus 100. The flexible display may be bent, curved, or rolled without being damaged by using a thin and flexible substrate like paper. The speaker is a device outputting information in an acoustic form (for example, speech). The speaker may directly output various alarms or audio messages as well as various audio data on which various processes such as decoding, amplification, and noise filtering are performed by an audio processor (not illustrated), in an acoustic form.

Hereinafter, an embodiment of the disclosure will be described with reference to drawings for describing software components and an operation sequence.

Figure 4A:
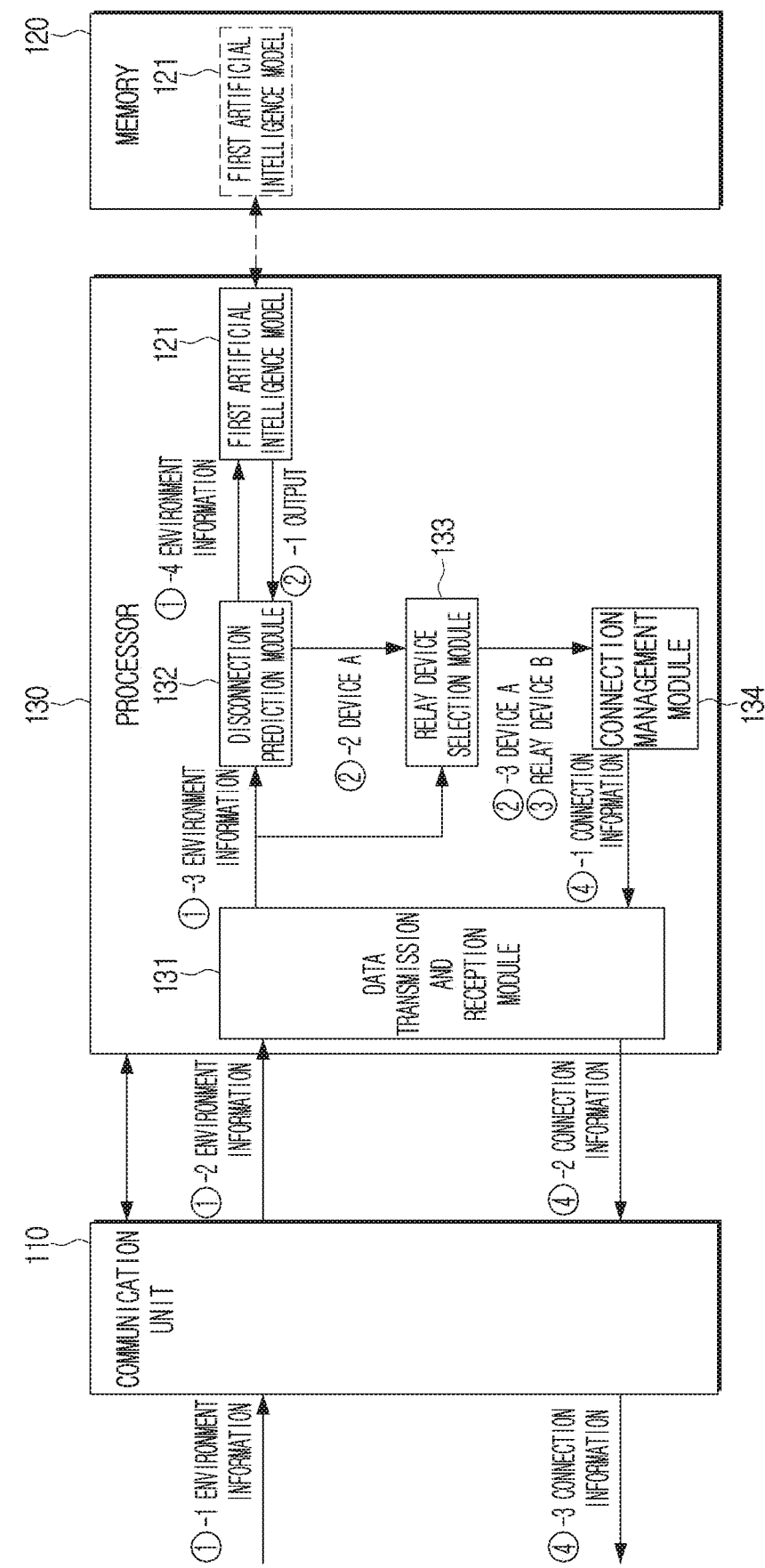
FIG. 4A is a block diagram for describing software components combined with hardware components of an electronic apparatus according to an embodiment of the disclosure.
Figure 4B:
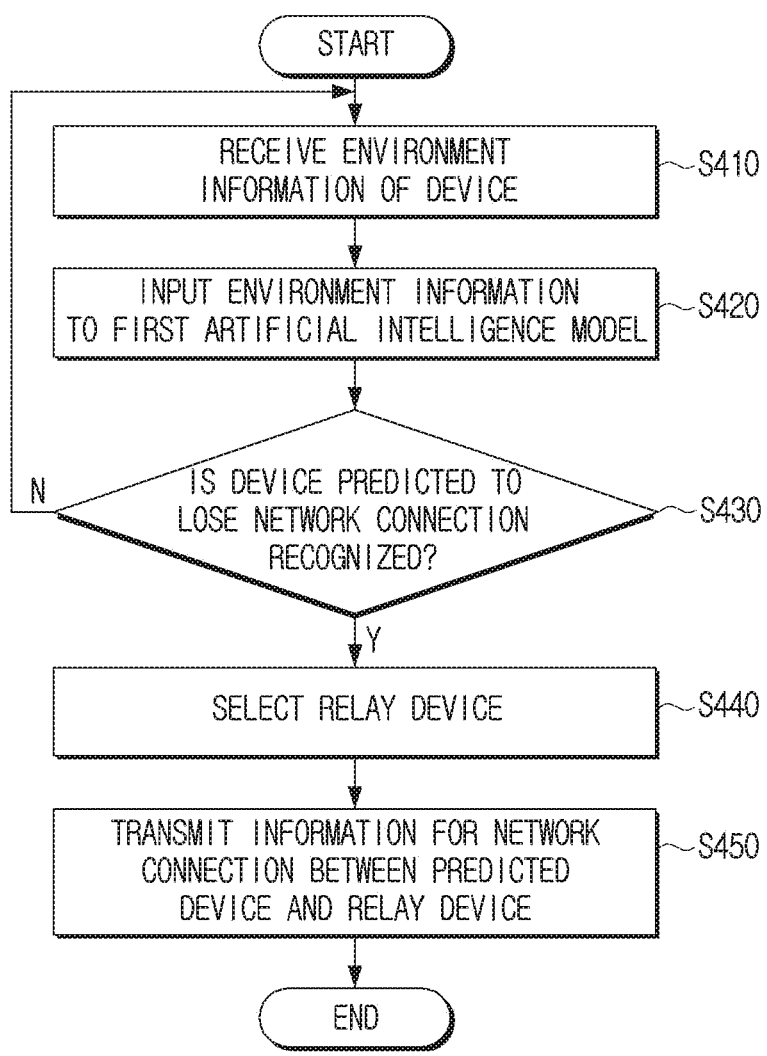
FIG. 4B is a flowchart for describing operation of an electronic apparatus according to an embodiment of the disclosure.

FIG. 4A is a block diagram for describing software components combined with hardware components of an electronic apparatus according to an embodiment of the disclosure. FIG. 4B is a flowchart for describing operation of the electronic apparatus according to an embodiment of the disclosure.

Referring to FIG. 4A, illustrated is a state in which a plurality of modules are loaded (or executed) by the processor 130 and operated in the processor 130, and the plurality of modules may be stored in the memory 120.

Referring to FIGS. 4A and 4B, the processor 130 may control the general operation of the electronic apparatus 100 by executing a module or instruction stored in the memory 120. For example, the processor 130 may read and interpret the module or instruction and determine a sequence for data processing. Accordingly, the processor 130 may control operation of another device such as the communication unit 110 or the memory 120 by transmitting a control signal for controlling the operation of the other device.

First, the processor 130 may receive information (for example, environment information) from the plurality of devices 200 via the communication unit 110 through a data transmission and reception module 131 (①-1 and ①-2 of FIG. 4A) at operation S410 in FIG. 4B. Here, the information received from the plurality of devices 200 may be the same or different for each device, and may be one of information included in the environment information. Further, the environment information may be implemented in a data format suitable for recognition (alternatively, read or use) by each module.

Further, the processor 130 may input the information (for example, environment information) received through the data transmission and reception module 131 to the first artificial intelligence model 121 through a disconnection prediction module 132 at operation S420 in FIG. 4B.

Specifically, the processor 130 may load the first artificial intelligence model 121 stored in the memory 120 and input the information (for example, environment information) received through the data transmission and reception module 131 to the first artificial intelligence model 121 through the disconnection prediction module 132 (①-3 and ①-4 of FIG. 4A).

To this end, the first artificial intelligence model 121 may be trained to predict a device that is to lose a network connection, based on training data. Specifically, the first artificial intelligence model 121 may be trained to predict a device that is to lose a network connection by using, as the training data, environment information obtained from each of the plurality of devices 200 in case that a network connection of at least one of the plurality of network-connected devices 200 is lost.

According to an embodiment, the processor 130 may train the first artificial intelligence model 121 by using output data (for example, information on a device that has lost a network connection) at a specific point in time and input data (for example, environment information obtained from each of the plurality of devices 200) obtained until the specific point in time.

FIG. 4C is a diagram for describing a method of training a first artificial intelligence model according to an embodiment of the disclosure.

Referring to FIG. 4C, a method of training the first artificial intelligence model 121 will be described under the assumption that a network connection of the device A (200-A) is maintained until 9 o'clock and 22 minutes, and the network connection is lost at 9 o'clock and 23 minutes.

In this case, the processor 130 may train the first artificial intelligence model 121 by using environment information 410-1 to 410-B obtained until a specific point in time as input data 410, and using information on a device (for example, the device A (200-A)) that has lost a network connection as output data 420, the device being identified based on respective network connection states 420-1, 420-2, 420-A, and 420-B of the plurality of devices 200-1 to 200B at the specific point in time. Here, the environment information 410-1 to 410-B may be environment information obtained from the plurality of devices 200-1 to 200-B, respectively. Further, the network connection state may be information indicating that a network connection between a device and the electronic apparatus 100 is maintained or lost.

For example, the processor 130 may train the first artificial intelligence model 121 by using the environment information (for example, environment information obtained from 9 o'clock to 9 o'clock and 22 minutes) obtained from each of the plurality of devices 200-1 to 200-B until a first point in time (for example, 9 o'clock and 22 minutes) as input data, and using information (for example, information indicating that there is no device that has lost a network connection) on a device that has lost a network connection among the plurality of devices 200-1 to 200-B at the first point in time (for example, 9 o'clock and 22 minutes) as output data. Further, the processor 130 may train the first artificial intelligence model 121 by using the environment information (for example, environment information obtained from 9 o'clock to 9 o'clock and 23 minutes) obtained from each of the plurality of devices 200-1 to 200-B until a second point in time (for example, 9 o'clock and 23 minutes) as input data, and using information (for example, information on the device A (200-A)) on a device that has lost a network connection among the plurality of devices 200-1 to 200-B at the second point in time (for example, 9 o'clock and 23 minutes) as output data.

As such, the processor 130 may train the first artificial intelligence model 121 at each point in time by using, as training data, output data at a specific point in time and input data obtained until the specific point in time. Meanwhile, the above description is only an example, and the processor 130 may also train the first artificial intelligence model 121 at each point in time by using environment information 410-1 to 410-B obtained until a point in time (for example, 9 o'clock and 19 minutes) before a specific point in time (for example, 9 o'clock and 20 minutes) as the input data 410, and using information on a device (for example, the device A (200-A)) that has lost a network connection as the output data 420, the device being identified based on the respective network connection states 420-1 to 420-B of the plurality of devices 200-1 to 200B at the specific point in time (for example, 9 o'clock and 20 minutes).

Here, the input data 410 of the first artificial intelligence model 121 may include the environment information 410-1 to 410-B obtained from the plurality of devices 200-1 to 200-B, respectively, and the environment information may be different for each device. For example, the environment information 410-1 of the device 1 (200-1) which is a microwave oven may include an operation (defrost mode) performed by the device 1 (200-1) and a time remaining until the operation (defrost mode) of the device 1 (200-1) is completed, the environment information 410-2 of the device 2 (200-2) which is a door sensor may include sensing information (whether or not a door is open) of the device 2 (200-2), the environment information 410-A of the device A (200-A) which is a robotic vacuum cleaner may include a location of the device A (200-A) and a battery level of the device A (200-A), and the environment information 410-B of the device B (200-B) which is a washing machine may include an operation (dewatering) performed by the device B (200-B), a completion rate of the operation performed by the device B (200-B), and the like. However, the disclosure is not limited thereto and various modifications may be possible.

Further, the processor 130 may identify a device predicted to lose a network connection among the plurality of devices 200 through the disconnection prediction module 132 at operation S430 in FIG. 4B.

Specifically, the processor 130 may obtain output data output from the first artificial intelligence model 121 by inputting, as input data, environment information obtained from each of the plurality of network-connected devices 200 to the first artificial intelligence model 121 (②-1 of FIG. 4A). In this case, the processor 130 may identify a device predicted to lose a network connection among the plurality of devices 200 based on the output of the first artificial intelligence model 121.

According to an embodiment, the output of the first artificial intelligence model 121 may include a quantitative value (for example, a provability value) indicating how high the possibility that a network connection of each of the plurality of devices 200 is lost is. In this case, the processor 130 may identify a device corresponding to an output of the first artificial intelligence model 121 with a predetermined value or more among the plurality of devices 200 as a device predicted to lose a network connection. For example, in case that it is assumed that an output of the first artificial intelligence model 121 for the device A (200-A) is 0.9 and an output of the first artificial intelligence model 121 for the device 1 (200-1) is 0.4, the processor 130 may identify, as a device predicted to lose a network connection, the device A (200-A) corresponding to an output of the first artificial intelligence model 121 with a predetermined value (for example, 0.7) or more, rather than the device 1 (200-1).

According to an embodiment, the output of the first artificial intelligence model 121 may include identification information (for example, identification information) of a device predicted to lose a network information among the plurality of devices 200. In this case, the processor 130 may identify a device (for example, the device A (200-A)) corresponding to the identification information among the plurality of devices 200 as a device predicted to lose a network connection.

Meanwhile, in case that a device (for example, the device A (200-A)), predicted to lose a network connection is identified at operation S430 in FIG. 4B, the processor 130 may generate notification information (for example, information in a form of text, images, or speech) for notifying that the predicted device A (200-A) is to lose a network connection through a notification module (not illustrated).

In this case, according to an embodiment, the processor 130 may display the notification information on a display (not illustrated) of the electronic apparatus 100 in a form of text or images through the notification module (not illustrated), or may perform a control to output the notification information through a speaker (not illustrated) of the electronic apparatus 100 in a form of speech. Alternatively, according to another embodiment, the processor 130 may control the communication unit 110 to transmit the notification information to a predetermined device through the data transmission and reception module 131. In this case, the predetermined device may provide, to the user, the received notification information in a form of text, images, or speech. Here, the predetermined device may be the predicted device A (200-A), the master device, or a device selected by the user among the plurality of devices 200.

Further, the processor 130 may select (or identify) another device (for example, the device B (200-B)) for maintaining the network connection of the predicted device A (200-A) among the plurality of devices 200 through a relay device selection module 133 at operation S440 in FIG. 4B. Here, the other device for maintaining the network connection of the predicted device A (200-A) will be referred to as a relay device for convenience of explanation.

Specifically, in case that the device A (200-A) predicted to lose a network connection to the electronic apparatus 100 is identified at operation S430 in FIG. 4B, the processor 130 may access information (for example, environment information) received through the data transmission and reception module 131 and information on a device (for example, the device A (200-A)) predicted through the disconnection prediction module 132 (①-3 and ②-2 of FIG. 4A).

In this case, the processor 130 may select (or identify) a relay device for relaying the network connection between the predicted device A (200-A) and the electronic apparatus 100 based on information regarding a network connection of each device included in environment information of each device through the relay device selection module 133 at operation S440 in FIG. 4B.

According to an embodiment, in case that the device A (200-A) is predicted to lose a network connection to the electronic apparatus 100 through a first communication method (for example, Wi-Fi connection to the bridge apparatus 300) among the plurality of devices 200, the processor 130 may select (or identify), as the relay device, a device that may perform a second communication method (for example, Bluetooth) which may be performed by the device A (200-A) based on information (for example, identification information of each device or a communication method that may be performed by each device) regarding a network connection of each device.

According to an embodiment, the processor 130 may select (or identify), as the relay device, a device located within a predetermined distance (for example, 10 m in case of Bluetooth) from a location of the device A (200-A) predicted to lose a network connection according to a communication method that may be performed by the device A (200-A) based on information (for example, identification information of each device, a communication method that may be performed by each device, or a current location of each device) regarding a network connection of each device.

According to an embodiment, the processor 130 may determine communication performance for relaying a network connection between the predicted device A (200-A) and the electronic apparatus 100 based on the information (for example, identification information of each device, a communication method that may be performed by each device, or a network state of each device) regarding a network connection of each device. Further, the processor 130 may select (or identify), as the relay device, a device with the highest communication performance among the plurality of devices 200, based on the communication performance. Here, the communication performance may be determined based on various indices such as a transmission rate (for example, a unit of Gbit/s), transmission delay (for example, a unit of ms), RSSI (for example, a unit of dBm), and a maximum communication distance according to the communication method. Further, a weight value may be predetermined for each index. For example, the processor 130 may calculate scores of respective devices by adding up values obtained by multiplying each index by the predetermined weight value and select (or identify), as the relay device, a device with the highest score among the scores of the respective devices.

Meanwhile, the processor 130 may select (or identify) a plurality of relay devices for relaying the network connection between the predicted device A (200-A) and the electronic apparatus 100. In this case, the processor 130 may set priorities for a plurality of relay devices. Here, the priority may refer to an order of relay devices to establish a network connection to a device (for example, the device A (200-A)) predicted to lose a network connection among the plurality of relay devices. For example, the processor 130 may set priorities for the plurality of relay devices in a manner in which the highest priority is set for a relay device with the highest communication performance, or the processor 130 may set priorities for the plurality of relay devices in a manner in which the highest priority is set for a relay device that is nearest to the predicted device A (200-A).

Here, the processor 130 may set priorities for the plurality of relay devices by giving a weight value to each type (for example, a microwave oven or air conditioner) of device. For example, the communication performance may rapidly deteriorate due to electromagnetic waves (for example, electromagnetic waves at a frequency of 2.45 GHz generated to cook foods, or electromagnetic waves at a frequency of 60 Hz generated to operate the microwave oven) generated at the time of operation of a microwave oven. In order to prevent such a situation, the processor 130 may set a lower priority for the microwave oven in comparison to other relay devices by giving a low weight value to the microwave oven.

Further, the processor 130 may control the communication unit 110 to transmit, to the predicted device (for example, the device A (200-A)) and the selected device B (200-B), connection information for a network connection between the predicted device A (200-A) and the selected device B (200-B) through a connection management module 134 and the data transmission and reception module 131 at operation S450 in FIG. 4B.

Here, the connection information may be the same or different depending on the communication method or target devices. Further, the connection information may be implemented in a data format suitable for recognition (alternatively, read or use) by each module.

Specifically, the processor 130 may access information on the device A (200-A) predicted through the disconnection prediction module 132 and information on the device B (200-B) selected through the relay device selection module 133 (②-3 and ③ of FIG. 4A), and generate the connection information for the network connection between the predicted device A (200-A) and the selected device B (200-B) based on the accessed information, through the connection management module 134. In this case, the processor 130 may transfer the generated connection information to the data transmission and reception module 131 (④-1 of FIG. 4A). Further, the processor 130 may control the communication unit 110 to transmit the connection information to the predicted device (for example, the device A (200-A)) and the relay device (for example, the device B (200-B)) through the data transmission and reception module 131 (④-2 and ④-3 in FIG. 4A).

Meanwhile, the processor 130 may retrain the first artificial intelligence model 121 by using, as training data, a result on whether or not a network connection of the device A (200-A) predicted through the disconnection prediction module 132 (or a separate learning module (not illustrated)) is lost within a predetermined time, and store (or update) the retrained first artificial intelligence model 121 in the memory 120.

FIG. 5A is a block diagram for describing software components combined with hardware components of an electronic apparatus according to an embodiment of the disclosure. FIG. 5B is a flowchart for describing operation of the electronic apparatus according to an embodiment of the disclosure.

Referring to FIG. 5A, illustrated is a state in which a plurality of modules are loaded (or executed) by the processor 130 and operated in the processor 130, and the plurality of modules may be stored in the memory 120. Further, unless otherwise noted, the description of FIGS. 4A and 4B may be equally applied, and thus an overlapping description will be omitted.

Referring to FIGS. 5A and 5B, first, the processor 130 may receive information (for example, environment information) from the plurality of devices 200 via the communication unit 110 through the data transmission and reception module 131 (①-1 and ①-2 of FIG. 5A) at operation S510 in FIG. 5B.

Further, the processor 130 may load the first artificial intelligence model 121 stored in the memory 120 and input the information (for example, environment information) received through the data transmission and reception module 131 to the first artificial intelligence model 121 through the disconnection prediction module 132 (①-3 and ①-4 of FIG. 5A) at operation S520 in FIG. 5B.

Further, the processor 130 may identify a device (for example, the device A (200-A)) predicted to lose a network connection among the plurality of devices 200 through the disconnection prediction module 132 (②-1 of FIG. 5A) at operation S530 in FIG. 5B).

Further, the processor 130 may load the second artificial intelligence model 122 stored in the memory 120 and input the information (for example, environment information) received through the data transmission and reception module 131 and information on the device (for example, the device A (200-A)) predicted to lose a network connection through the disconnection prediction module 132 to the second artificial intelligence model 122 through the relay device selection module 133 (①-3, ②-2, ①-5, and ②-3 of FIG. 5A) at operation S540 in FIG. 5B.

To this end, the second artificial intelligence model 122 may be trained to identify another device (for example, a relay device) for maintaining a network connection of the device (for example, a relay target device) predicted to lose a network connection among the plurality of network-connected devices 200, based on training data. Specifically, the second artificial intelligence model 122 may be trained based on training data including information (for example, information regarding a network connection of each device included in the environment information) on a state of communication for a network connection between the predicted device and at least one device located around the predicted device among the plurality of devices 200, and information (for example, an operation progress state of each device or information regarding a surrounding environment of each device included in the environment information) on the plurality of devices obtained during a time including a point in time at which the network connection is established.

According to an embodiment, the processor 130 may train the second artificial intelligence model 122 by using, as training data, output data (for example, information on a relay device that may relay a network connection between a relay target device and the electronic apparatus 100) at a specific point in time and input data (for example, environment information obtained from each of the plurality of devices 200) obtained before the specific point in time.

FIG. 5C is a diagram for describing a method of training a second artificial intelligence model according to an embodiment of the disclosure.

Referring to FIG. 5C, a method of training the second artificial intelligence model 122 under the assumption that a relay target device among the plurality of devices 200-1 to 200-B is the device A (200-A).

In this case, the processor 130 may train the second artificial intelligence model 122 by using environment information 510-1, 510-2, and 510-B obtained until a specific point in time as input data 510, and using information on a relay device as output data 520, the relay device being identified based on respective network connection relay capable states 520-1, 520-2, and 520-B of the remaining devices 200-1, 200-2, and 200-B at the specific point in time. Here, the environment information 510-1, 510-2, and 510-B may be environment information obtained from the remaining devices 200-1, 200-2, and 200-B other than the relay target device A (200-A) among the plurality of devices 200-1 to 200-B, respectively. Further, the network connection relay capable state may be information indicating that a network connection between the relay target device A (200-A) and the electronic apparatus 100 may be relayed or not.

For example, the processor 130 may train the second artificial intelligence model 122 by using environment information (for example, environment information obtained from 9 o'clock to 9 o'clock and 22 minutes) obtained from each of the remaining devices 200-1, 200-2, and 200-B other than the relay target device (for example, the device A (200-A)) among the plurality of devices 200-1 to 200-B until a first point in time (for example, 9 o'clock and 22 minutes) as input data, and using information (for example, information on the device 1 (200-1) and the device B (200-B)) on a device that may perform relaying among the remaining devices 200-1, 200-2, and 200-B at the first point in time (for example, 9 o'clock and 22 minutes) as output data. Further, the processor 130 may train the second artificial intelligence model 122 by using environment information (for example, environment information obtained from 9 o'clock to 9 o'clock and 23 minutes) obtained from each of the remaining devices 200-1, 200-2, and 200-B other than the relay target device (for example, the device A (200-A)) among the plurality of devices 200-1 to 200-B until a second point in time (for example, 9 o'clock and 23 minutes) as input data, and using information (for example, information on the device B (200-B)) on a device that may perform relaying among the remaining devices 200-1, 200-2, and 200-B at the second point in time (for example, 9 o'clock and 23 minutes) as output data.

As such, the processor 130 may train the second artificial intelligence model 122 at each point in time by using output data at a specific point in time and input data obtained until the specific point in time as training data. Meanwhile, the above description is only an example, and the processor 130 may also train the second artificial intelligence model 122 at each point in time by using environment information obtained from each of the remaining devices 200-1, 200-2, and 200-B until a point in time (for example, 9 o'clock and 19 minutes) before a specific point in time (for example, 9 o'clock and 20 minutes) as the input data 510, and using information on a relay device as the output data 520, the relay device being identified based on the respective network connection relay capable states 520-1, 520-2, and 520-B of the remaining devices 200-1, 200-2, and 200-B at the specific point in time (for example, 9 o'clock and 20 minutes). Further, the processor 130 may select (or identify) another device (for example, the device B (200-B)) for maintaining the network connection of the predicted device A (200-A) among the plurality of devices 200 through the relay device selection module 133 at operation S550 in FIG. 5B. Here, the other device may be referred to as the relay device.

Specifically, the processor 130 may obtain output data output from the second artificial intelligence model 122 by inputting, as input data, environment information obtained from each of the plurality of network-connected devices 200 and information on the device A (200-A) predicted to lose a network connection to the second artificial intelligence model 122 through the relay device selection module 133 (③-1 of FIG. 5A). In this case, the processor 130 may identify (or select) another device of the plurality of devices 200 as the relay device based on the output of the second artificial intelligence model 122.

According to an embodiment, the output of the second artificial intelligence model 122 may include a quantitative value (for example, a probability value) for each of the remaining devices other than the predicted device A (200-A) among the plurality of network-connected devices 200. Here, the quantitative value may be a value indicating whether or not the device is suitable as the relay device. In this case, the processor 130 may select a device corresponding to an output of the second artificial intelligence model 122 with a predetermined value or more among the plurality of devices 200 as the relay device.

According to an embodiment, the output of the second artificial intelligence model 122 may include identification information (for example, identification information of the device B (200-B)) of the relay device. In this case, the processor 130 may select a device (for example, the device B (200-B)) corresponding to the identification information among the plurality of devices 200 as the relay device.

Meanwhile, in case that the device A (200-A) is predicted to lose a network connection to the electronic apparatus 100 through the first communication method (for example, Wi-Fi connection to the bridge apparatus 300) among the plurality of devices 200, the second artificial intelligence model 122 may be trained to select (or identify), as the relay device, a device that may perform the second communication method (for example, Bluetooth) which may be performed by the device A (200-A) by using, as training data, the information (for example, identification information of each device or a communication method that may be performed by each device) regarding a network connection of each device.

Meanwhile, the second artificial intelligence model 122 may be trained to select (or identify) a device with the highest communication performance for relaying a network connection between the predicted device A (200-A) and the electronic apparatus 100 as the relay device, by using, as training data, the information (for example, identification information of each device, a communication method that may be performed by each device, or a network state of each device) regarding a network connection of each device.

Meanwhile, the second artificial intelligence model 122 may be trained to set priorities for relay devices in case that a plurality of relay devices are selected (or identified). Here, the priority may refer to an order of relay devices to establish a network connection to a device (for example, the device A (200-A)) predicted to lose a network connection among the plurality of relay devices. Meanwhile, the second artificial intelligence model 122 may be trained to set a low priority for a device (for example, a microwave oven) of which communication performance varies depending on the type of device.

Further, the processor 130 may control the communication unit 110 to transmit, to the predicted device (for example, the device A (200-A)) and the selected device B (200-B), connection information for a network connection between the predicted device A (200-A) and the selected device B (200-B) through the connection management module 134 and the data transmission and reception module 131 at operation S560 in FIG. 5B.

Specifically, the processor 130 may access information on the device A (200-A) predicted through the disconnection prediction module 132 and information on the device B (200-B) selected through the relay device selection module 133 (②-4 and ③-2 of FIG. 4A), and generate the connection information for the network connection between the predicted device A (200-A) and the selected device B (200-B) based on the accessed information, through the connection management module 134. In this case, the processor 130 may transfer the generated connection information to the data transmission and reception module 131 (④-1 of FIG. 5A). Further, the processor 130 may control the communication unit 110 to transmit the connection information to the predicted device (for example, the device A (200-A)) and the relay device (for example, the device B (200-B)) through the data transmission and reception module 131 (④-2 and ④-3 in FIG. 5A).

Meanwhile, the processor 130 may retrain the second artificial intelligence model 122 by using, as training data, a result on whether or not the relay device B (200-B) selected through the relay device selection module 133 (or a separate learning module (not illustrated)) maintains a network connection of the predicted device A (200-A), and store (or update) the retrained second artificial intelligence model 122 in the memory 120.

Figure 6A:
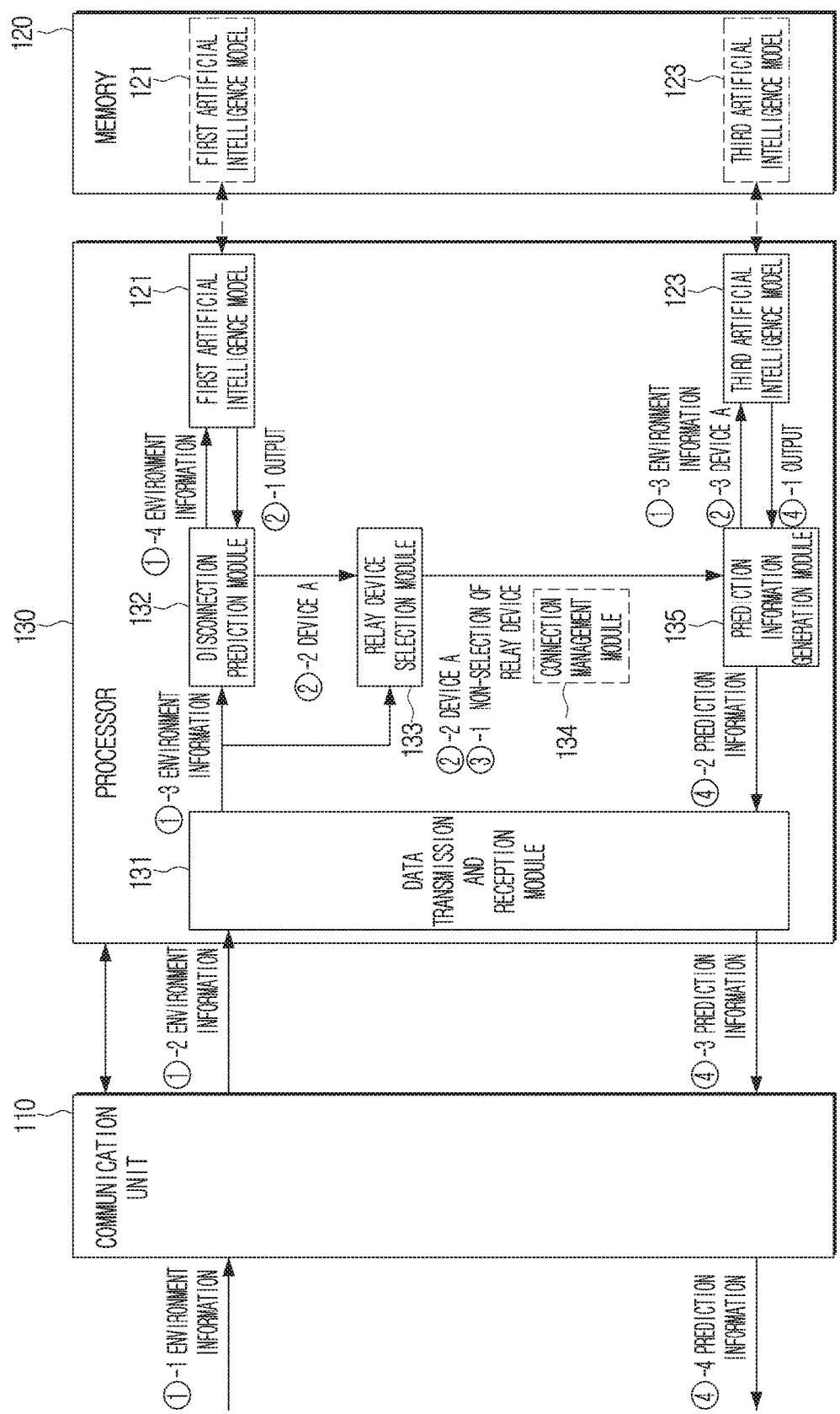
FIG. 6A is a block diagram for describing software components combined with hardware components of an electronic apparatus according to an embodiment of the disclosure.
Figure 6B:
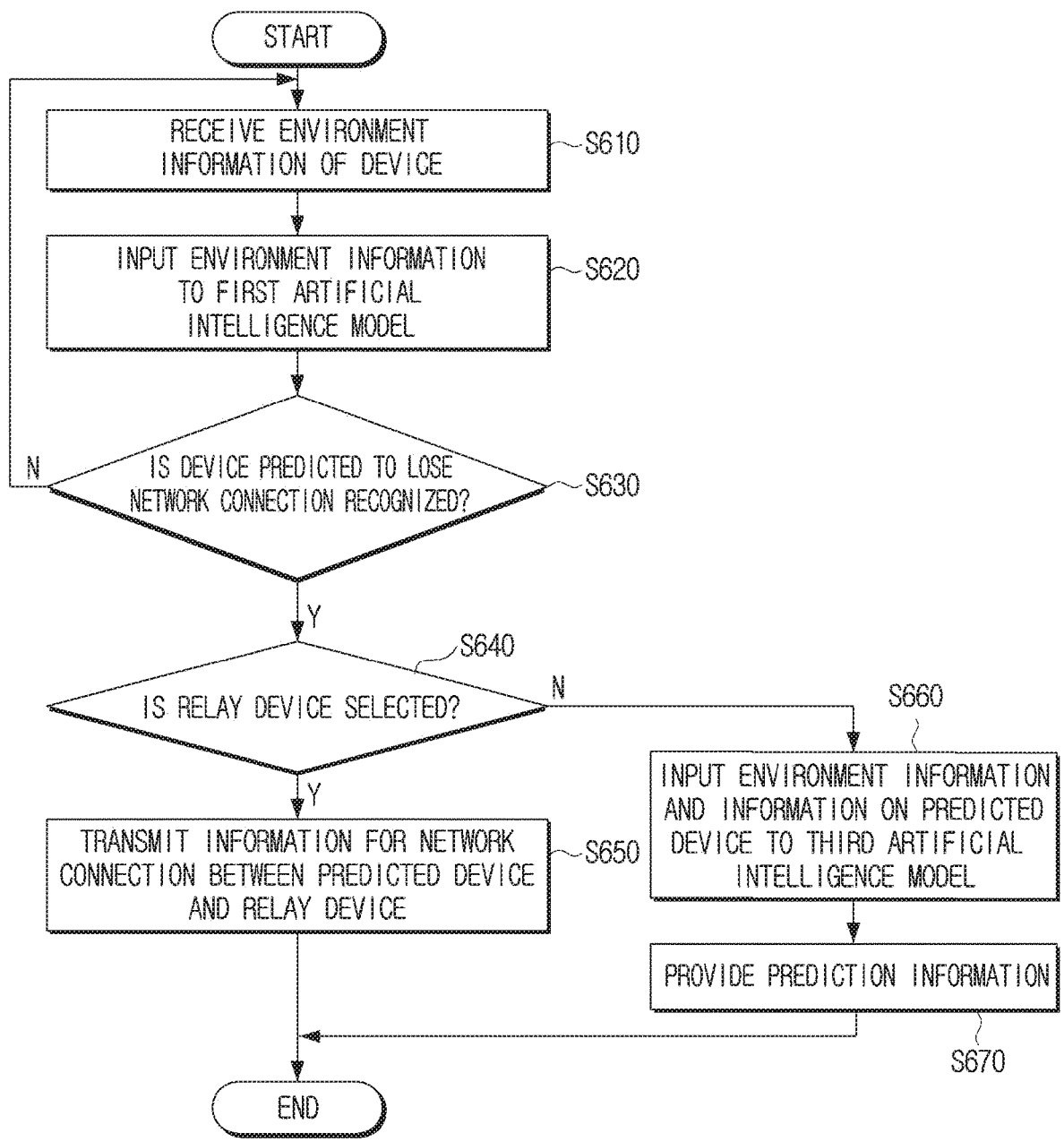
FIG. 6B is a flowchart for describing operation of an electronic apparatus according to an embodiment of the disclosure.

FIG. 6A is a block diagram for describing software components combined with hardware components of an electronic apparatus according to an embodiment of the disclosure. FIG. 6B is a flowchart for describing operation of the electronic apparatus according to an embodiment of the disclosure.

Referring to FIG. 6A, illustrated is a state in which a plurality of modules are loaded (or executed) by the processor 130 and operated in the processor 130, and the plurality of modules may be stored in the memory 120. Further, unless otherwise noted, the above description may be equally applied, and thus an overlapping description will be omitted.

Referring to FIGS. 6A and 6B, first, the processor 130 may receive information (for example, environment information) from the plurality of devices 200 via the communication unit 110 through the data transmission and reception module 131 (①-1 and ①-2 of FIG. 6A) at operation S610 in FIG. 6B.

Further, the processor 130 may load the first artificial intelligence model 121 stored in the memory 120 and input the received information (for example, environment information) to the first artificial intelligence model 121 through the disconnection prediction module 132 (①-3 and ①-4 of FIG. 6A) at operation S620 in FIG. 6B.

Further, the processor 130 may identify a device (for example, the device A (200-A)) predicted to lose a network connection among the plurality of devices 200 through the disconnection prediction module 132 (②-1 of FIG. 6A) at operation S630 in FIG. 6B.

According to an embodiment, in case that another device (relay device) of the plurality of devices 200 is selected through the relay device selection module 133 at operation in FIG. 6B, the processor 130 may obtain connection information for a network connection between the predicted device A (200-A) and the selected device B (200-B) through the connection management module 134 and control the communication unit 110 to transmit, to the predicted device (for example, the device A (200-A)) and the selected device B (200-B), the connection information through the data transmission and reception module 131 at operation S650 in FIG. 6B. A detailed description thereof has been provided with reference to FIGS. 4A to 5C, and thus an overlapping description will be omitted here.

According to another embodiment, it is assumed that the processor 130 does not select another device (relay device) of the plurality of devices 200 through the relay device selection module 133 at operation S640 in FIG. 6B. In other words, it is assumed that there is no suitable relay device that may relay a network connection of the device A (200-A) predicted to lose a network connection.

In this case, the processor 130 may load a third artificial intelligence model 123 stored in the memory 120, and in response to information on the predicted device (for example, the device A (200-A)) and information indicating non-selection (or non-identification) of the relay device being received from the relay device selection module 133 (②-2 and ③-1 of FIG. 6A), the processor 130 may input the information on the predicted device (for example, the device A (200-A)) and environment information to the third artificial intelligence model 123 through a prediction information generation module 135 ((①-3 and ②-3 of FIG. 6A) at operation S660 in FIG. 6B.

Here, the third artificial intelligence model 123 may be a model trained based on training data including information on a device predicted to lose a network connection and an operation progress state of the predicted device.

FIG. 6C is a diagram for describing a method of training a third artificial intelligence model according to an embodiment of the disclosure.

Referring to FIG. 6C, in case that the device A (200-A) predicted to lose a network connection is a device X of FIG. 6C, the third artificial intelligence model 123 may be trained by using data including an operation progress state of the device X until 10 o'clock and 20 minutes as input data, and by using an operation progress state of device X at 10 o'clock and 21 minutes as output data. Further, the third artificial intelligence model 123 may be trained by using data including an operation progress state of the device X until 10 o'clock and 21 minutes as input data, and by using an operation progress state of device X at 10 o'clock and 22 minutes as output data. As such, the third artificial intelligence model 123 may be trained by periodically repeating the above-described process.

Further, referring to FIG. 6C, the third artificial intelligence model 123 may be trained for each device such as the device X and a device Y. Here, an item output as an operation progress state of each device may be set to be different for each device.

For example, in case of a robotic vacuum cleaner (for example, the device X of FIG. 6C), a predetermined item output as an operation progress state may include an operation (for example, automatic cleaning, section cleaning, or energy-saving mode), a current location, a battery level, a moving direction, and the like. In case of a washing machine (for example, the device Y of FIG. 6C), a predetermined item output as an operation progress state may include an operation (for example, washing, rinsing, dewatering, or energy-saving mode), a completion rate, an operation time, a remaining time, and the like. In case of a microwave oven (not illustrated), a predetermined item output as an operation progress state may include an operation (for example, cooking mode, defrost mode, or energy-saving mode), a completion rate, an operation time, a remaining time, and the like. In case of a TV (not illustrated), a predetermined item output as an operation progress state may include an operation (for example, broadcast view mode, movie view mode, or video on demand (VOD) view mode), a title of content that is being viewed, a completion rate, a viewing time, a remaining time, and the like.

Further, the training data of the third artificial intelligence model 123 may include an operation progress state obtained by a device (for example, the device A (200-A)) predicted to lose a network connection during a time (for example, a time from a point in time at which a network connection is lost to a point in time at which the network connection is resumed) for which a network connection of the device is lost.

For example, the processor 130 may receive, from a device (for example, the device A (200-A)) that has resumed a network connection after the loss of the network connection, information regarding an operation progress state of the device via the communication unit 110. Here, the information regarding the operation progress state of the device may be information obtained by the device (for example, the device A (200-A)) during a time for which the network connection is lost. In this case, the processor 130 may trains the third artificial intelligence model 123 by using the received information as training data.

Further, the processor 130 may obtain (or generate) output data output from the third artificial intelligence model 123 through the prediction information generation module 135 (④-1 of FIG. 6A).

According to an embodiment, a description will be provided under the assumption that the device A (200-A) predicted to lose a network connection is the device X of FIG. 6C and the network connection is lost at 10 o'clock and 25 minutes.

In this case, the processor 130 may input an operation progress state of the device X received from 10 o'clock and 20 minutes to 10 o'clock and 24 minutes to the third artificial intelligence model 123 as illustrated in FIG. 6C and obtain output data output from the third artificial intelligence model 123, through the prediction information generation module 135. Here, the output data may be prediction information about the operation progress state of the device X at 10 o'clock and 25 minutes.

Then, the processor 130 may input an operation progress state of the device X received from 10 o'clock and 20 minutes to 10 o'clock and 24 minutes and prediction information for 10 o'clock and 25 minutes to the third artificial intelligence model 123 and obtain output data output from the third artificial intelligence model 123, through the prediction information generation module 135. Here, the output data may be prediction information about the operation progress state of the device X at 10 o'clock and 26 minutes.

The processor 130 may obtain prediction information in real time (or on a predetermined cycle) through the prediction information generation module 135 by repeating the above-described process.

Further, the processor 130 may provide prediction information about an operation progress state of the device A (200-A) that has lost a network connection, based on the output of the third artificial intelligence model 123 at operation S670 of FIG. 6B.

Specifically, the processor 130 may generate prediction information about an operation progress state of the device A (200-A) that has lost a network connection, based on the output of the third artificial intelligence model 123, through the prediction information generation module 135. In this case, the processor 130 may transfer the prediction information generated through the prediction information generation module 135 to the data transmission and reception module 131. Further, the processor 130 may control the communication unit 110 to transmit prediction information to at least one network-connected device of the plurality of devices 200 through the data transmission and reception module 131 ((④-3 and ④-4 in FIG. 6A). Here, the at least one device may be a predetermined device (for example, master device).

The processor 130 may provide prediction information about an operation progress state of the device A (200-A) that has lost a network connection, by repeating the above-described operations in real time (or on a predetermined cycle).

Figure 7A:
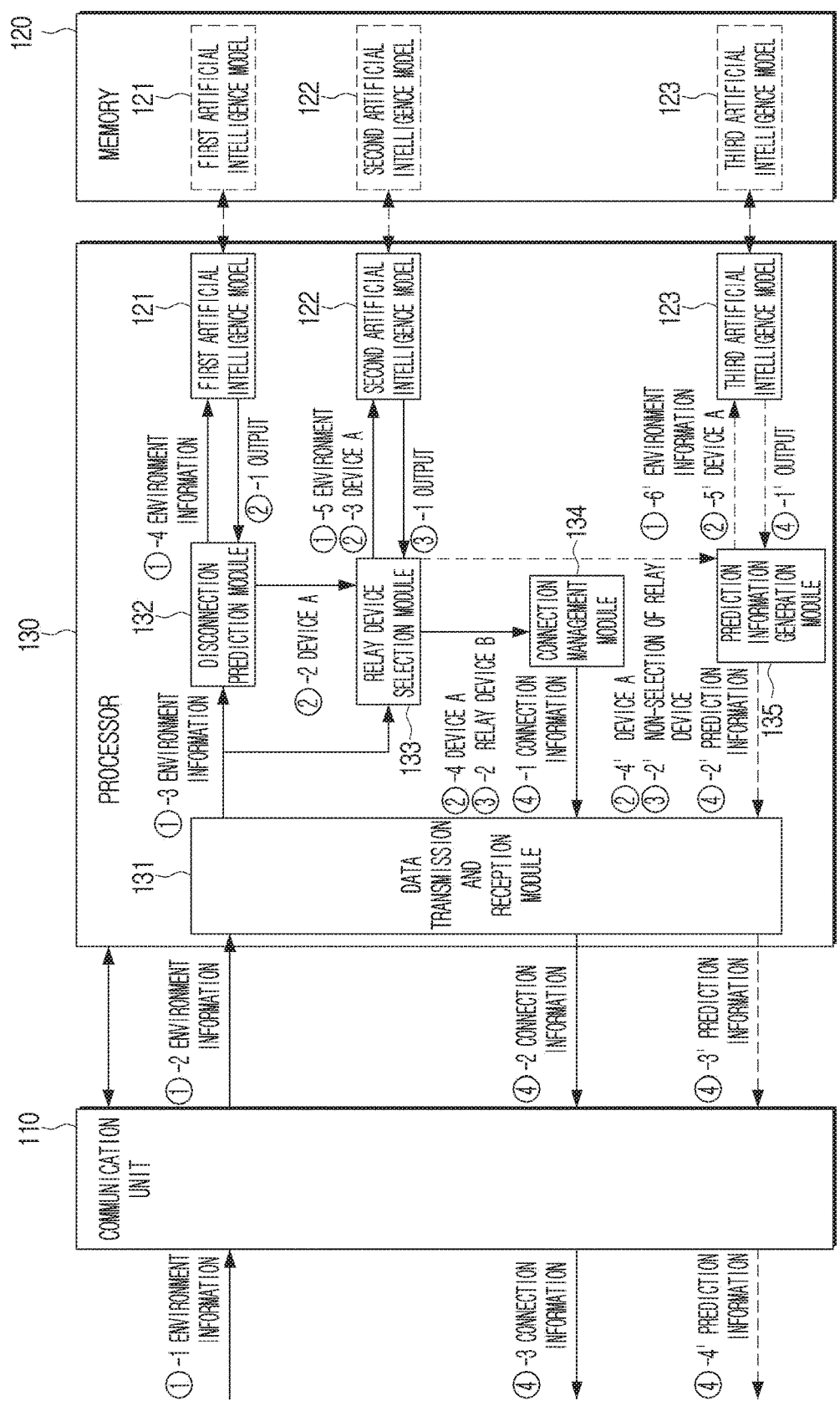
FIG. 7A is a block diagram for describing software components combined with hardware components of an electronic apparatus according to an embodiment of the disclosure.

FIG. 7A is a block diagram for describing software components combined with hardware components of an electronic apparatus according to an embodiment of the disclosure.

Figure 7B:
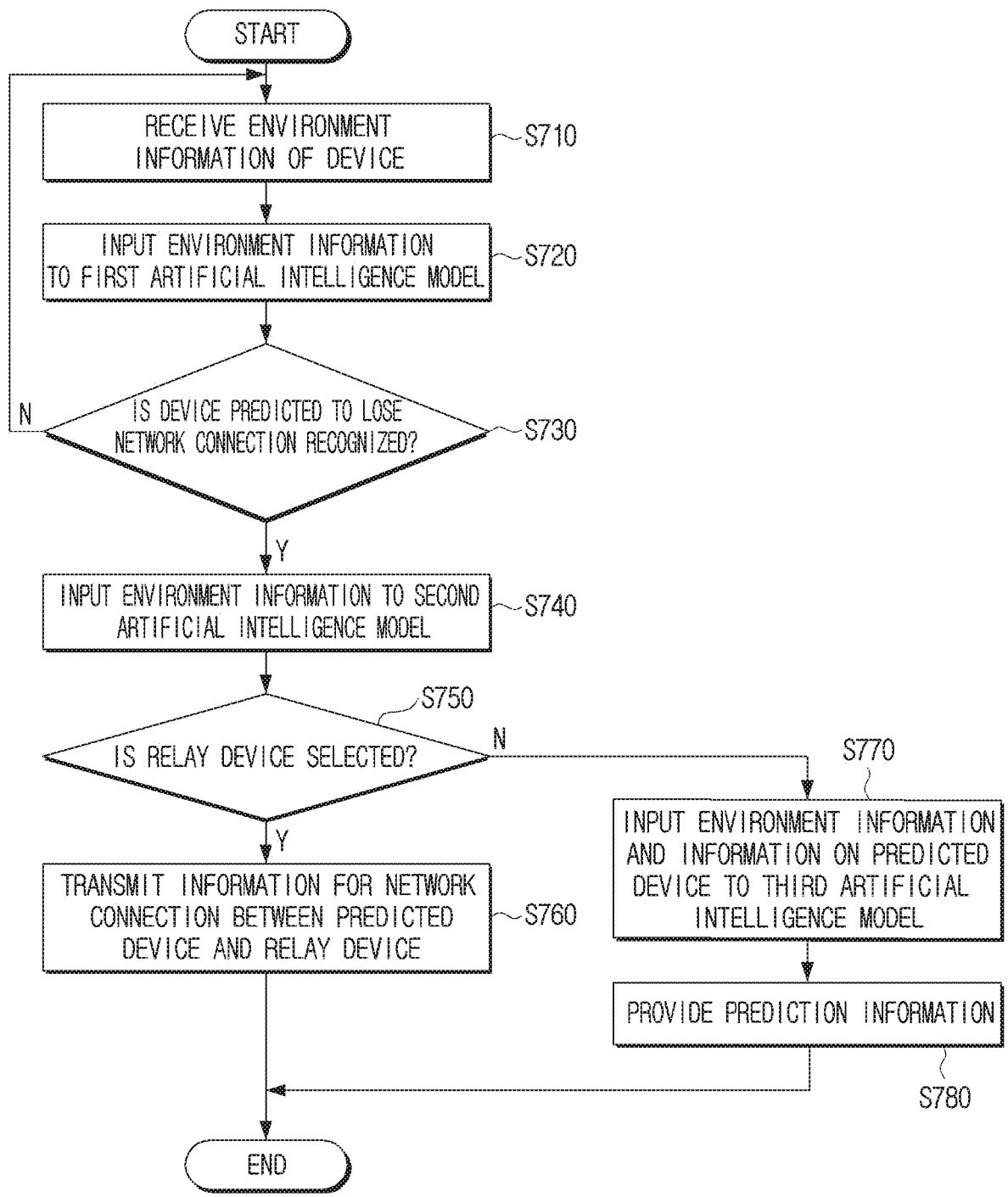
FIG. 7B is a flowchart for describing operation of an electronic apparatus according to an embodiment of the disclosure.

FIG. 7B is a flowchart for describing operation of the electronic apparatus according to an embodiment of the disclosure.

Referring to FIG. 7A, illustrated is a state in which a plurality of modules are loaded (or executed) by the processor 130 and operated in the processor 130, and the plurality of modules may be stored in the memory 120. Further, unless otherwise noted, the above description may be applied, and thus an overlapping description will be omitted.

Referring to FIGS. 7A and 7B, first, the processor 130 may receive information (for example, environment information) from the plurality of devices 200 via the communication unit 110 through the data transmission and reception module 131 (①-1 and ①-2 of FIG. 7A) at operation S710 in FIG. 7B.

Further, the processor 130 may load the first artificial intelligence model 121 and input the information (for example, environment information) received through the data transmission and reception module 131 to the first artificial intelligence model 121 through the disconnection prediction module 132 (①-3 and ①-4 of FIG. 7A) at operation S720 in FIG. 7B.

Further, the processor 130 may identify a device (for example, the device A (200-A)) predicted to lose a network connection among the plurality of devices 200 based on an output of the first artificial intelligence model 121 through the disconnection prediction module 132 (②-1 of FIG. 7A) at operation S730 in FIG. 7B.

Further, in case that the device (for example, the device A (200-A)) predicted to lose a network connection is identified at operation S730, the processor 130 may load the second artificial intelligence model 122 stored in the memory 120, receive information on the device (for example, the device A (200-A)) predicted to lose a network connection through the disconnection prediction module 132 and environment information (①-3 and ②-2 of FIG. 7A), and input the received information (the information on the predicted device and the environment information) to the second artificial intelligence model 122 through the relay device selection module 133 (①-5 and ②-3 of FIG. 7A) at operation S740 in FIG. 7B.

Further, the processor 130 may select (or identify) another device (for example, the device B (200-B)) for maintaining the network connection of the predicted device A (200-A) among the plurality of devices 200 through the relay device selection module 133 at operation S750 in FIG. 7B.

According to an embodiment, in case that another device (relay device) of the plurality of devices 200 is selected through the relay device selection module 133 (②-4 and ③-2 of FIG. 7A) at operation S750 in FIG. 7B, the processor 130 may control the communication unit 110 to transmit, to the predicted device (for example, the device A (200-A)) and the selected device B (200-B), connection information for a network connection between the predicted device A (200-A) and the selected device B (200-B) through the connection management module 134 and the data transmission and reception module 131 (④-1, ④-2, and ④-3 of FIG. 7A) at operation S760 in FIG. 7B.

According to another embodiment, in case that another device (relay device) of the plurality of devices 200 is not selected (②-4' and ③-2' of FIG. 7A) at operation S750 of FIG. 7B, the processor 130 may load the third artificial intelligence model 123 stored in the memory 120 and input the information on the device A (200-A) predicted to lose a network connection and the environment information to the third artificial intelligence model 123 through the prediction information generation module 135 (①-6', ②-5', and ④-1' of FIG. 7A) at operation S770 of FIG. 7B.

In this case, the processor 130 may obtain prediction information about an operation progress state of the predicted device A (200-A) based on an output of the third artificial intelligence model 123 through the prediction information generation module 135 (④-1' of FIG. 7A), and provide the prediction information to the user by controlling the communication unit 110 to transmit the prediction information to at least one of the plurality of devices 200 through the data transmission and reception module 131 (④-2', ④-3' and ④-4' of FIG. 7A) at operation S780 of FIG. 7B.

Meanwhile, in response to a network connection to the device A (200-A) being lost and then resumed, the electronic apparatus 100 may receive, from the device A (200-A), environment information including an operation progress state of the device A (200-A) obtained during the loss of the network connection of the device A (200-A), via the communication unit 110. In this case, the processor 130 may perform an update to replace the prediction information with the operation progress state of the device A (200-A) received via the communication unit 110. Further, the processor 130 may retrain the third artificial intelligence model 123 by using, as training data, the received information on the operation progress state of the device A (200-A) through the prediction information generation module 135 (or a separate learning module (not illustrated)), and store (or update) the retrained third artificial intelligence model 123 in the memory 120.

Figure 8A:
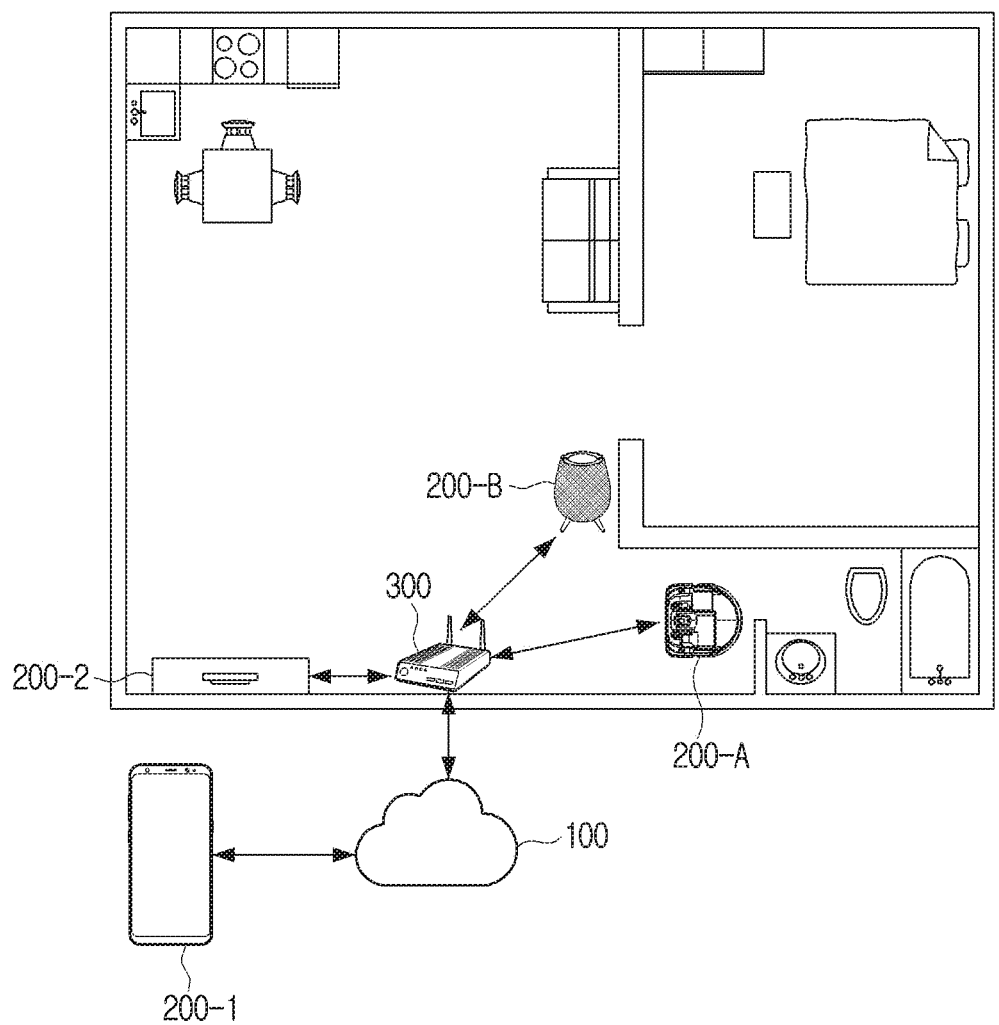
FIG. 8A is a diagram for describing an electronic apparatus according to an embodiment of the disclosure.
Figure 8B:
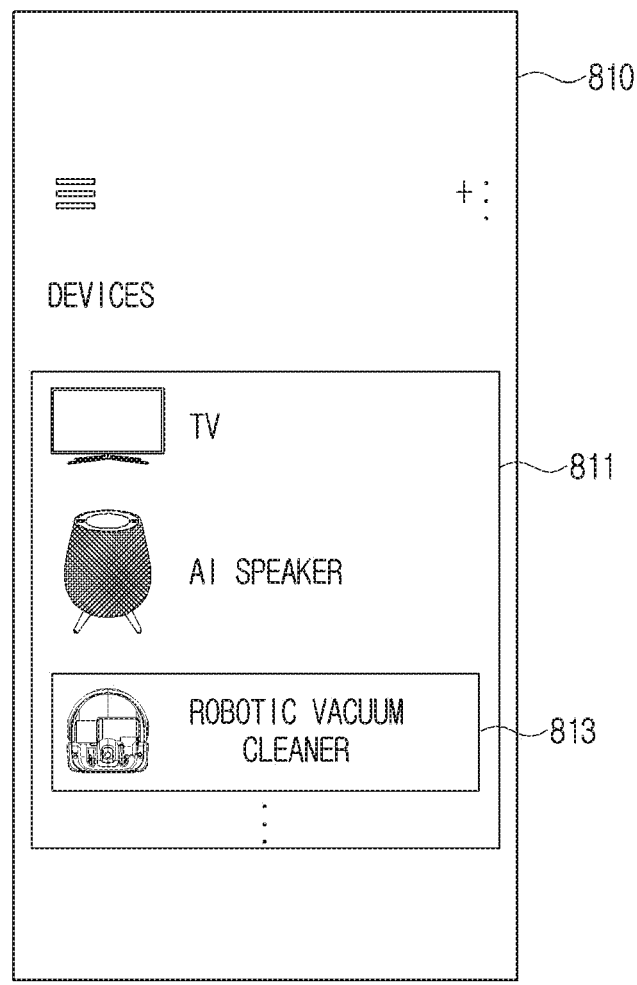
FIG. 8B is a diagram for describing a user interface (UI) provided to a user according to an embodiment of the disclosure.
Figure 8C:
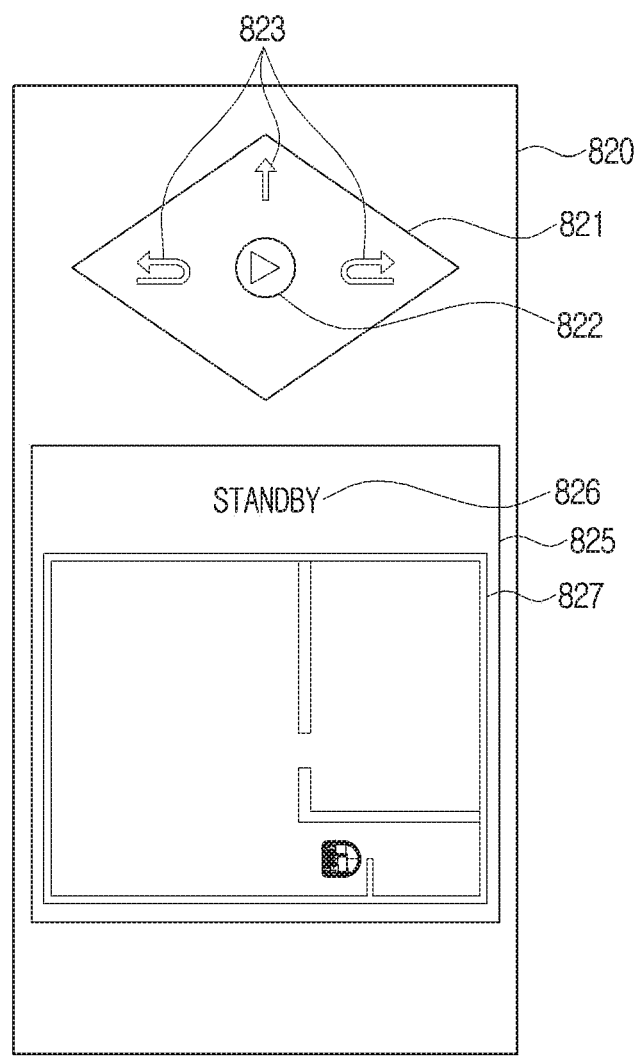
FIG. 8C is a diagram for describing a UI provided to a user according to an embodiment of the disclosure.

FIG. 8A is a diagram for describing an electronic apparatus according to an embodiment of the disclosure. FIG. 8B is a diagram for describing a user interface (UI) provided to a user according to an embodiment of the disclosure. FIG. 8C is a diagram for describing a UI provided to a user according to an embodiment of the disclosure.

Referring to FIGS. 8A, 8B and 8C, the electronic apparatus 100 may be network-connected to the plurality of devices 200-1 to 200-B.

For example, referring to FIG. 8A, the electronic apparatus 100 may be network-connected to the device 1 (200-1) through wireless 5G mobile communication. Further, the electronic apparatus 100 may be network-connected to the device 2 (200-2), the device A (200-A), and the device B (200-B) through the bridge apparatus 300. Here, the bridge apparatus 300 may be connected to the device 2 (200-2) and the device A (200-A) through a wireless Wi-Fi method, and may be connected to the device B (200-B) through a wired Ethernet method. However, this is only an example and the plurality of devices 200-1 to 200-B may each be network-connected to the electronic apparatus 100 through various methods.

Here, the electronic apparatus 100 may receive information (for example, environment information) from each of the plurality of network-connected devices 200-1 to 200-B.

In this case, referring to FIG. 8B, the electronic apparatus 100 may display a list of the plurality of devices 200-1 to 200-B on a display 810 of the electronic apparatus 100 based on the environment information received from each of the plurality of devices 200-1 to 200-B. Hereinafter, for convenience of explanation, a description will be provided under the assumption that the device A (200-A), which is a robotic vacuum cleaner, among the plurality of devices 200-1 to 200-B is selected in FIG. 8B.

Further, referring to FIG. 8C, in response to a user command to select one device 813 from a list 811 of the plurality of devices 200-1 to 200-B being received, the electronic apparatus 100 may display a UI 820 for the selected device on the display 810.

Here, the UI 820 for the selected device A (200-A) may include a control UI 821 for controlling the selected device A (200-A) and an information UI 825 for the selected device A (200-A).

For example, the control UI 821 may include a control icon 822 for an automatic cleaning mode of the selected device A (200-A), and a control icon 823 for a manual cleaning mode (for example, turning left, moving straight, or turning right) of the selected device A (200-A).

Further, the information UI 825 for the selected device A (200-A) may include information on an operation progress state of the device, the information included in the environment information received from the selected device A (200-A). For example, the information UI 825 for the selected device A (200-A) may include information (for example, standby) 826 on an operation performed by the selected device A (200-A) and map data 827 indicating a current location (for example, P(100,5)) of the device A (200-A).

Hereinafter, a description will be provided under the assumption that a user command to select the control icon 822 for performing the automatic cleaning mode in the control UI 821 displayed on the electronic apparatus 100 is received.

Once the user command to select the control icon 822 for performing the automatic cleaning mode in the control UI 821 is received, the electronic apparatus 100 may transmit a control command to control the device A (200-A) to perform the automatic cleaning mode, to the device A (200-A) via the communication unit 110.

Figure 9A:
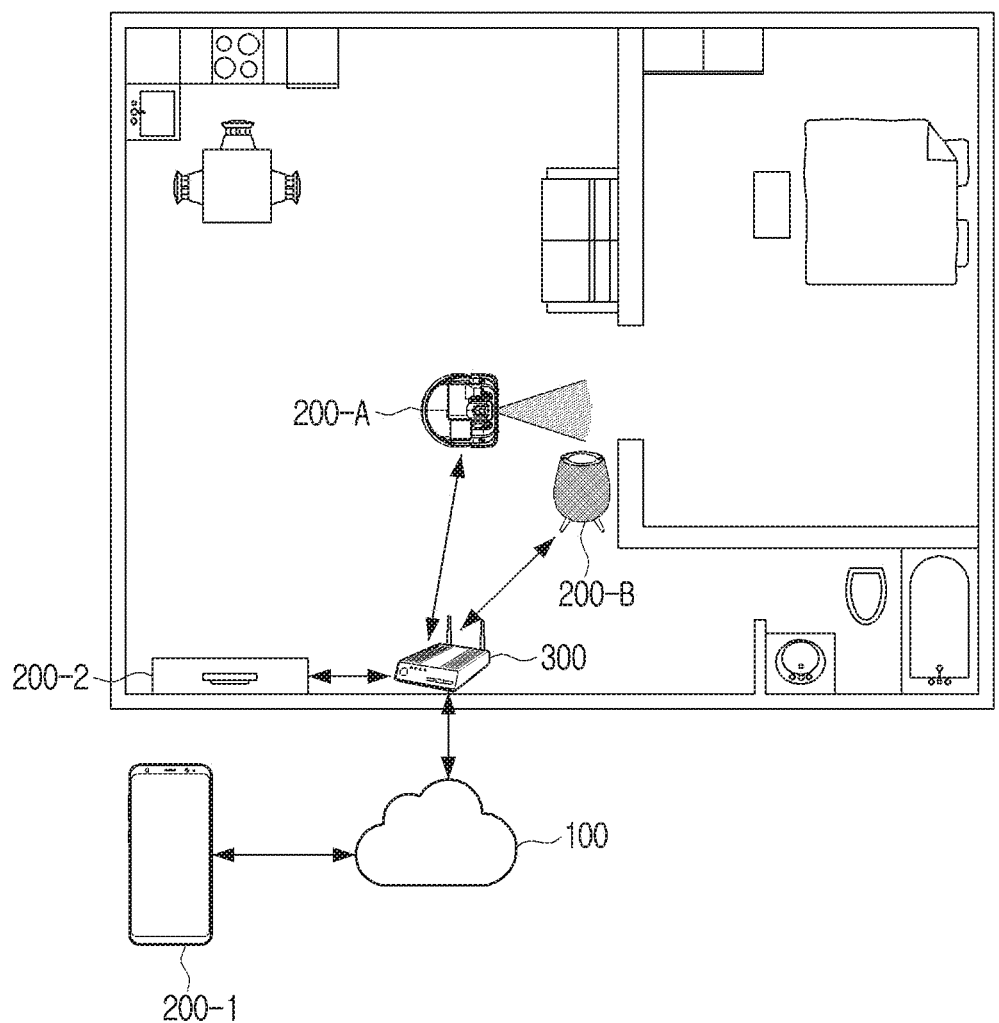
FIG. 9A is a diagram for describing an operation in which an electronic apparatus predicts a device that is to lose a network connection according to an embodiment of the disclosure.
Figure 9B:
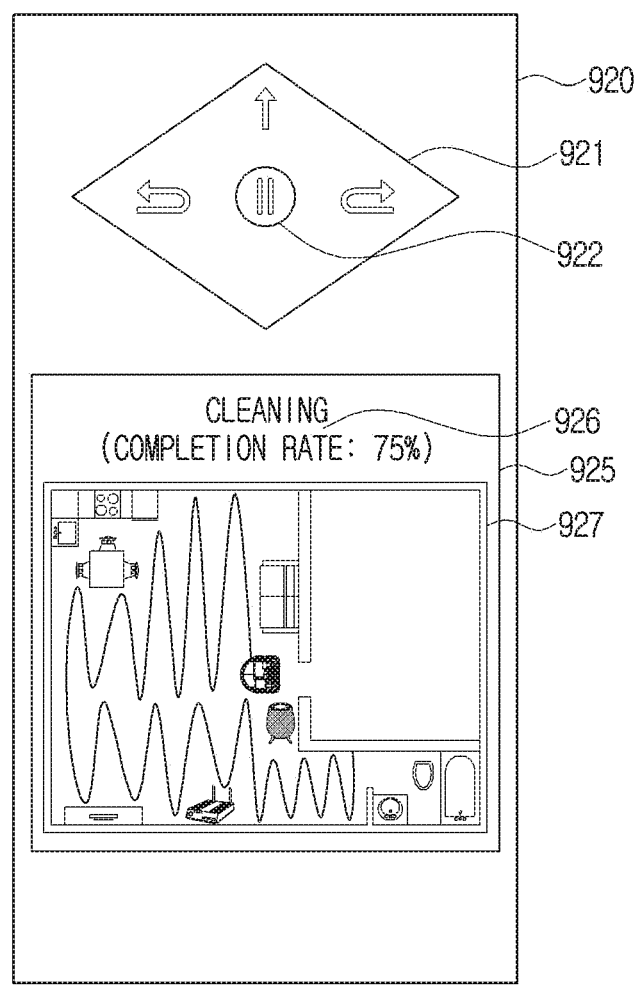
FIG. 9B is a diagram for describing a UI provided to a user according to an embodiment of the disclosure.

FIG. 9A is a diagram for describing an operation in which an electronic apparatus predicts a device that is to lose a network connection according to an embodiment of the disclosure. FIG. 9B is a diagram for describing a UI provided to a user according to an embodiment of the disclosure.

Referring to FIG. 9A, the device A (200-A) may switch from a standby mode to the automatic cleaning mode according to the received control command, and perform cleaning while moving indoors according to the automatic cleaning mode. Here, the device A (200-A) may transmit environment information to the electronic apparatus 100 to which the device A (200-A) is network-connected, during cleaning Particularly, the environment information may include an operation progress state of the device A (200-A).

Referring to FIGS. 9A and 9B, the electronic apparatus 100 may display information received from each of the plurality of devices 200-1 to 200-B on the display (not illustrated). Particularly, once the device A (200-A) is selected from the list 811 of the plurality of devices 200-1 to 200-B, the electronic apparatus 100 may display a UI 920 for the selected device A (200-A) on the display as illustrated in FIG. 9B.

Here, the UI 920 for the device A (200-A) may include a control UI 921 for controlling the device A (200-A), which includes a control icon 922, and an information UI 925 for the selected device A (200-A). Here, the information UI 925 for the selected device A (200-A) may include information on an operation progress state of the device, the information included in the environment information received from the selected device A (200-A). For example, the information UI 925 for the selected device A (200-A) may include information (for example, automatic cleaning mode) 926 on an operation performed by the device A (200-A) and map data 927 indicating a current location (for example, P(70, 50)) of the device A (200-A). Further, the map data 927 may include a location to which the selected device A (200-A) moves, information on surrounding objects sensed by the selected device A (200-A).

Hereinafter, a description will be provided under the assumption that the device A (200-A) that is performing the automatic cleaning mode moves to a region (coverage hole) in which a Wi-Fi connection to the bridge apparatus 300 may be lost.

In this case, the electronic apparatus 100 may receive information (for example, environment information) from each of the plurality of network-connected devices 200-1 to 200-B. Further, the electronic apparatus 100 may input the received environment information to the first artificial intelligence model 121 and predict a device (for example, the device A (200-A)) predicted to lose a network connection among the plurality of devices 200-1 to 200-B based on an output of the first artificial intelligence model 121.

Further, the electronic apparatus 100 may input information on the device A (200-A) predicted to lose a network connection and the received environment information to the second artificial intelligence model 122 and select a relay device for maintaining the network connection of the device (for example, the device A (200-A)) predicted to lose a network connection among the plurality of devices 200-1 to 200-B based on an output of the second artificial intelligence model 122.

First, according to an embodiment, the case that the device B (200-B) is selected as the relay device will be described with reference to FIGS. 10, 11A and 11B.

Figure 10:
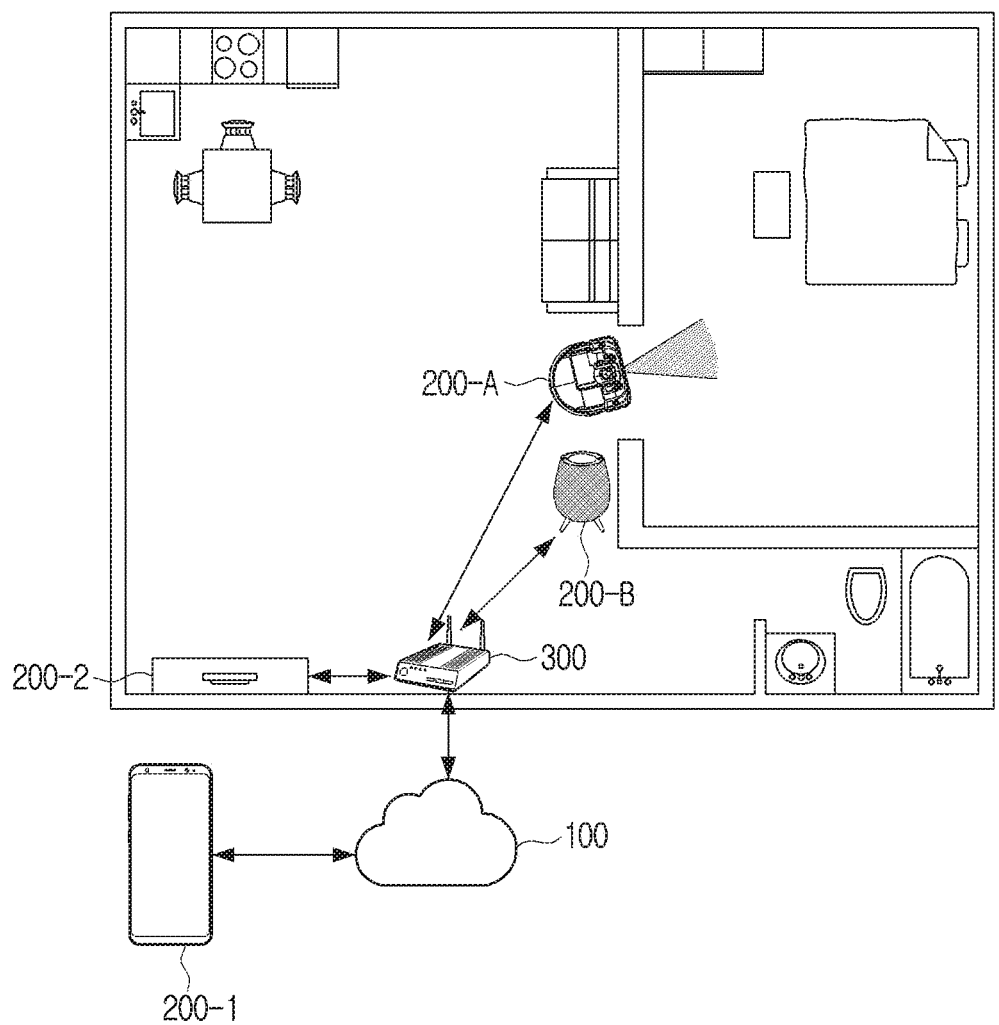
FIG. 10 is a diagram for describing an operation in which an electronic apparatus transmits connection information to a device that is to lose a network connection according to an embodiment of the disclosure.

FIG. 10 is a diagram for describing an operation in which an electronic apparatus transmits connection information to a device that is to lose a network connection according to an embodiment of the disclosure. FIG. 11A is a diagram for describing an operation in which an electronic apparatus maintains a network connection of a device that is to lose a network connection through another device according to an embodiment of the disclosure. FIG. 11B is a diagram for describing a UI provided to a user according to an embodiment of the disclosure.

Referring to FIG. 10, the electronic apparatus 100 may transmit, to the device A (200-A) predicted to lose a network connection and the selected device B (200-B), connection information for a network connection between the device A (200-A) predicted to lose a network connection and the selected device B (200-B).

Figure 11A:
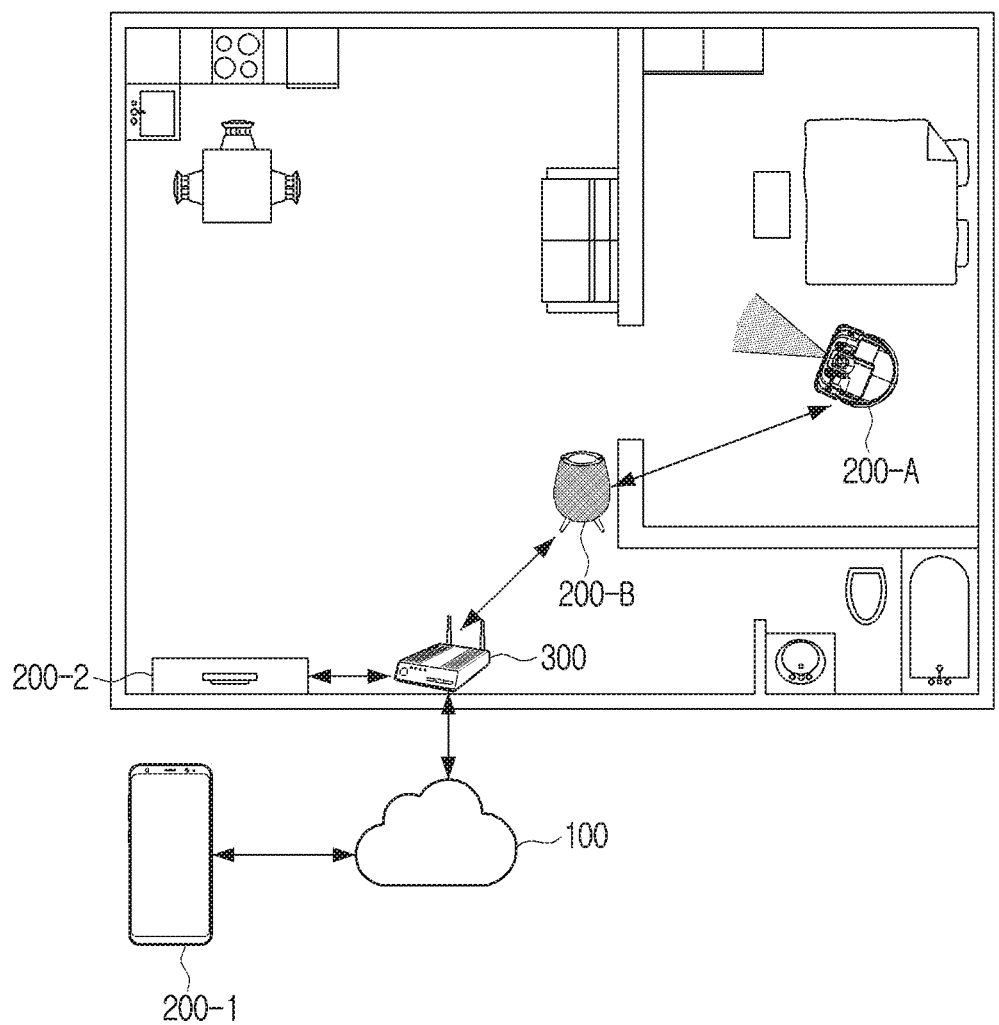
FIG. 11A is a diagram for describing an operation in which an electronic apparatus maintains a network connection of a device that is to lose a network connection through another device according to an embodiment of the disclosure.

Referring to FIG. 11A, in case that the device A (200-A) is predicted to lose a network connection to the bridge apparatus 300 through the Wi-Fi method moves to a Wi-Fi coverage hole of the bridge apparatus 300, the device A (200-A) may lose a Wi-Fi connection to the bridge apparatus 300. Here, the device A (200-A) and the device B (200-B) may establish a network connection through different communication methods (for example, Bluetooth) based on the connection information received from the electronic apparatus 100. Meanwhile, this is only an example, and the device A (200-A) and the device B (200-B) may establish a network connection through different communication methods (for example, Bluetooth) based on the connection information received from the electronic apparatus 100 even before the device A (200-A) lose the Wi-Fi connection to the bridge apparatus 300.

Therefore, a network connection between the electronic apparatus 100 and the device A (200-A) may be maintained through the device B (200-B).

In this case, the electronic apparatus 100 may receive information on an operation progress state of the device A (200-A) from the device A (200-A) and display the operation progress state on the display (not illustrated). Further, the electronic apparatus 100 may transmit, to the device A (200-A), a control command to control the device A (200-A) to perform a specific operation.

Figure 11B:
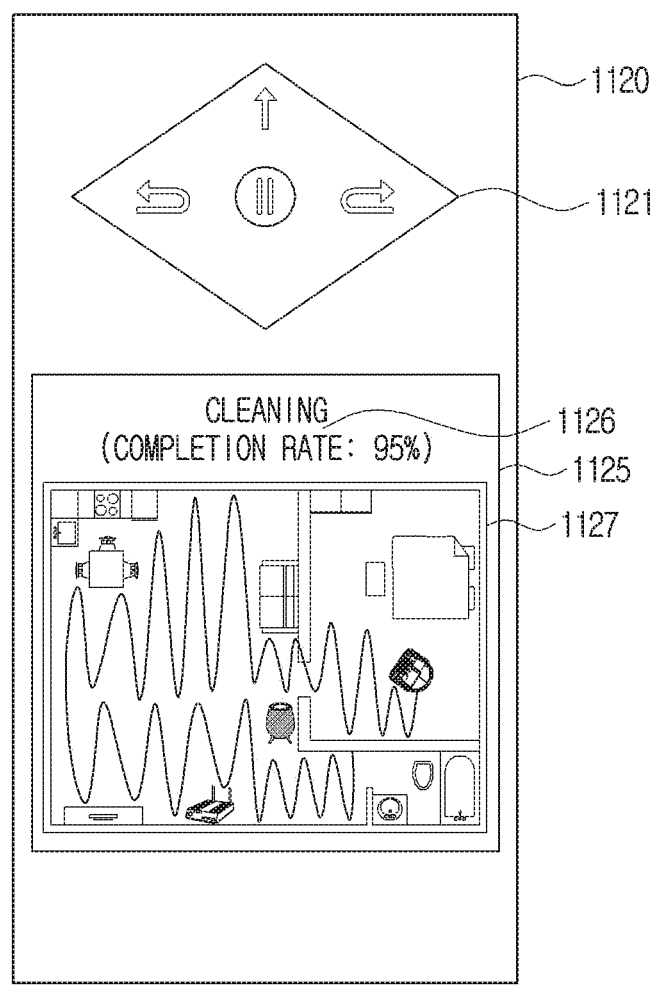
FIG. 11B is a diagram for describing a UI provided to a user according to an embodiment of the disclosure.

Referring to FIG. 11B, the electronic apparatus 100 may display a UI 1120 for the device A (200-A) on the display (not illustrated). Here, the UI 1120 for the device A (200-A) may include a control UI 1121 for controlling the device A (200-A) and an information UI 1125 for the selected device A (200-A).

Here, the electronic apparatus 100 may control the device A (200-A) through the control UI 1121 and display the operation progress state (for example, information (for example, automatic cleaning mode or completion rate (95%)) 1126 on an operation performed by the device A (200-A) and map data 1127 indicating a current location (for example, P(95,40)) of the device A (200-A)) of the device A (200-A) through the information UI 1125 for the selected device A (200-A).

Meanwhile, according to another embodiment, the case that the relay device is not selected will be described with reference to FIGS. 12A to 14B.

Figure 12A:
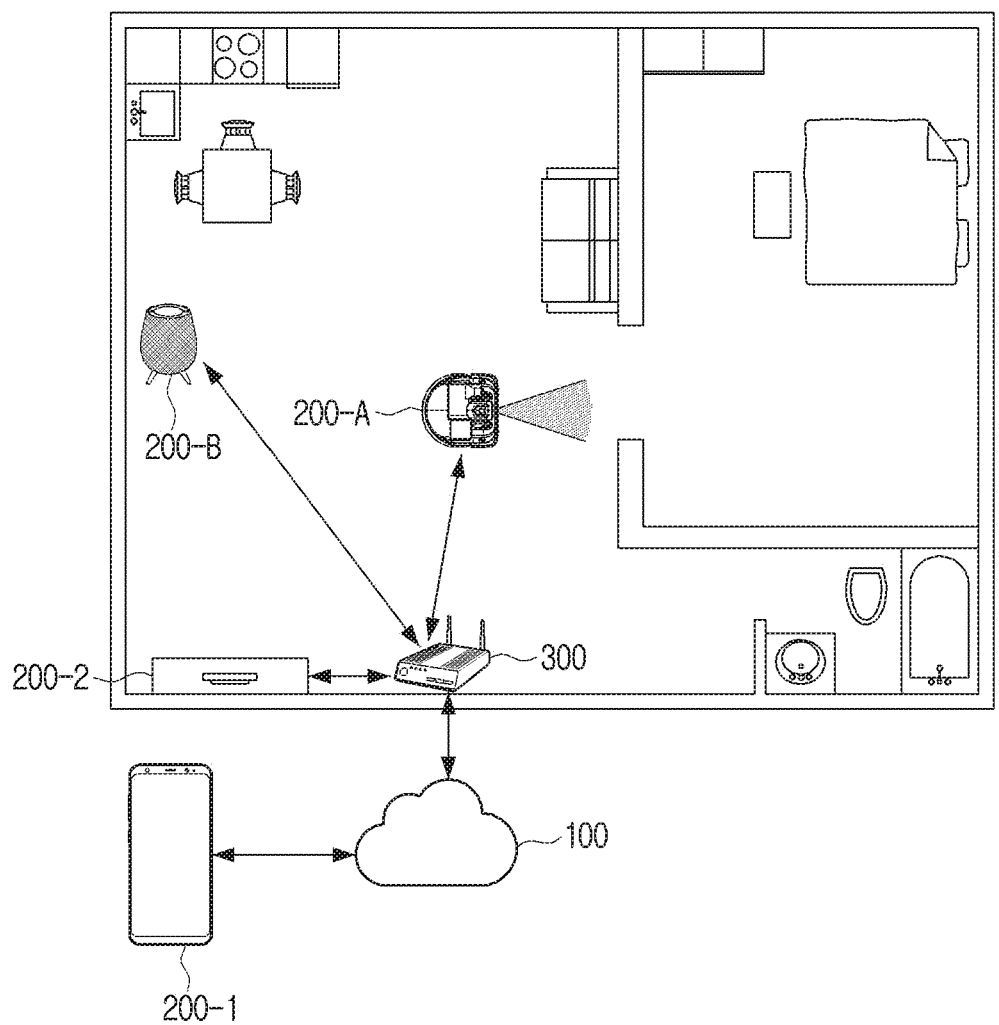
FIG. 12A is a diagram for describing a case where a relay device is not identified according to an embodiment of the disclosure.
Figure 12B:
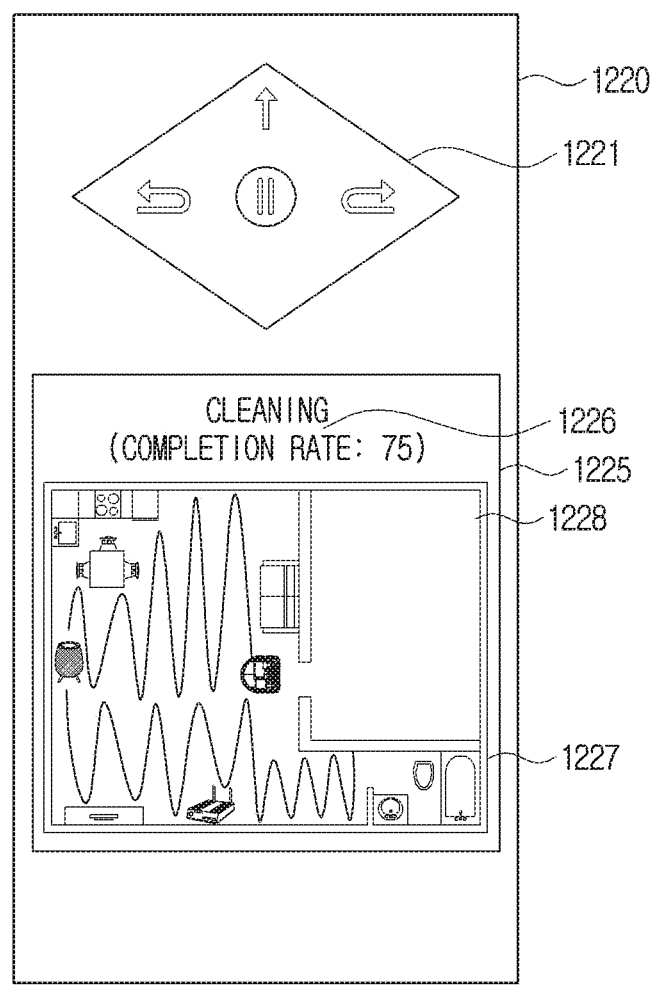
FIG. 12B is a diagram for describing a UI provided to a user according to an embodiment of the disclosure.

FIG. 12A is a diagram for describing a case where a relay device is not identified according to an embodiment of the disclosure. FIG. 12B is a diagram for describing a UI provided to a user according to an embodiment of the disclosure.

Referring to FIGS. 12A and 12B, the electronic apparatus 100 may receive information (for example, environment information) from each of the plurality of network-connected devices 200-1 to 200-B. Further, the electronic apparatus 100 may input the received environment information to the first artificial intelligence model 121 and predict a device (for example, the device A (200-A)) predicted to lose a network connection among the plurality of devices 200 based on an output of the first artificial intelligence model 121.

Further, the electronic apparatus 100 may input information on the device A (200-A) predicted to lose a network connection and the environment information received from the plurality of devices 200-1 to 200-B to the second artificial intelligence model 122 and obtain information indicating non-selection (or non-identification) of a relay device based on an output of the second artificial intelligence model 122.

In this case, the electronic apparatus 100 may input information including an operation progress state of the device A (200-A) received before the network connection of the predicted device A (200-A) is lost to the third artificial intelligence model 123 and obtain prediction information on the operation progress state of the device A (200-A) based on an output of the third artificial intelligence model 123.

Further, in this case, the network connection of the device A (200-A) is not yet lost, and thus the electronic apparatus 100 may receive information on an operation progress state of the device A (200-A) from the device A (200-A) and display the operation progress state 1226 on the display as illustrated in FIG. 12B. Specifically, FIG. 12B illustrates a UI 1220 including a control UI 1221 and an information UI 1225. The information UI 1225 may include the operation progress states 1226, map data 1227, and a location 1228 that has not been completed.

Figure 13A:
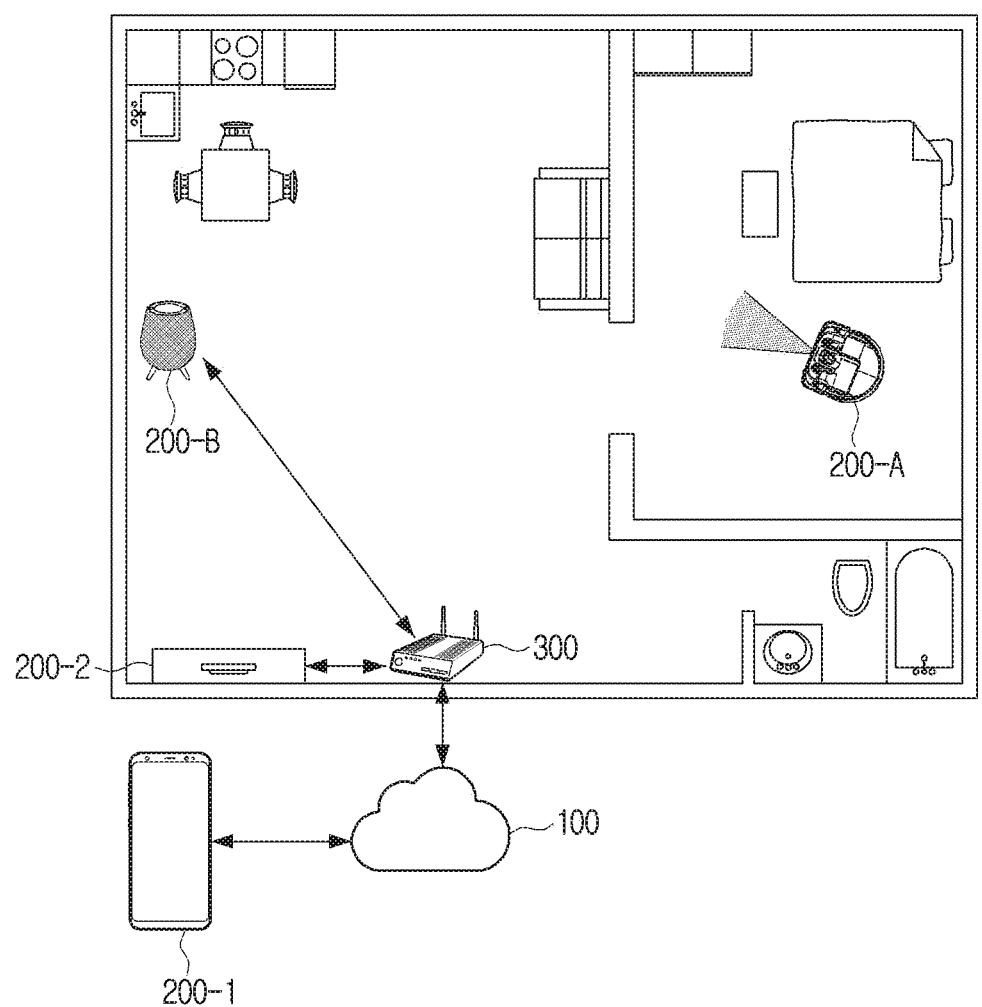
FIG. 13A is a diagram for describing an operation in which an electronic apparatus provides prediction information about a device that has lost a network connection according to an embodiment of the disclosure.
Figure 13B:
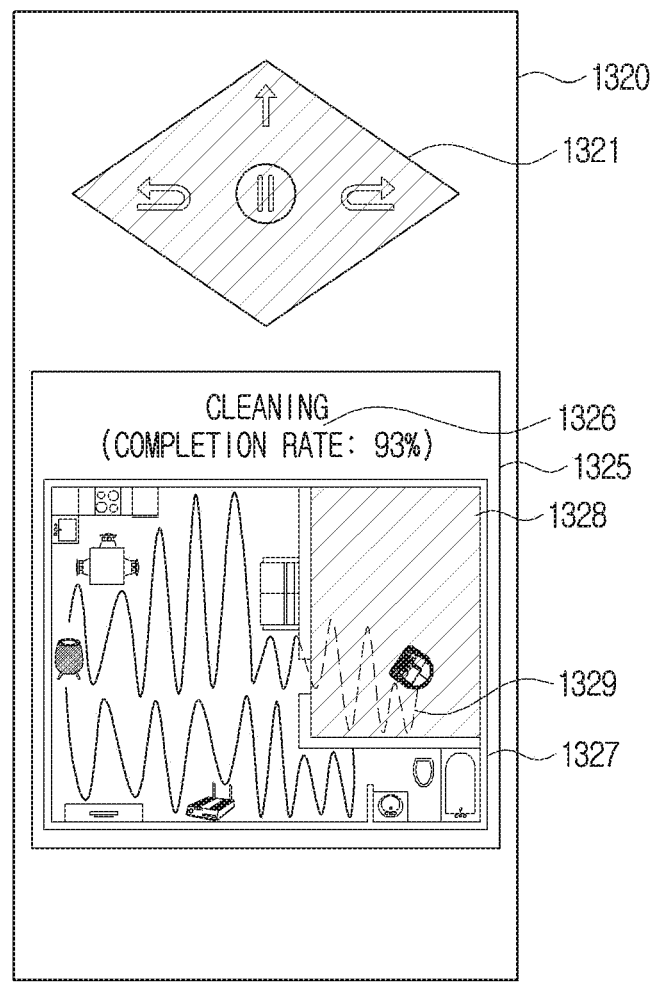
FIG. 13B is a diagram for describing a UI provided to a user according to an embodiment of the disclosure.

FIG. 13A is a diagram for describing an operation in which an electronic apparatus provides prediction information about a device that has lost a network connection according to an embodiment of the disclosure. FIG. 13B is a diagram for describing a UI provided to a user according to an embodiment of the disclosure.

Referring to FIGS. 13A and 13B, in response to the network connection of the device A (200-A) being lost, the electronic apparatus 100 may input information (for example, information on the device A (200-A) and the environment information) received from the device A (200-A) before the network connection of the device A (200-A) is lost to the third artificial intelligence model 123, and provide, to the user, prediction information about the operation progress state of the device A (200-A) based on an output of the third artificial intelligence model 123.

For example, as illustrated in FIG. 13B, the electronic apparatus 100 may display a UI 1320 for the device A (200-A) on the display. Here, the UI 1320 for the device A (200-A) may include a UI 1321 (for example, a dimmed UI) for notifying that the device A (200-A) may not be controlled and an information UI 1325 for the device A (200-A). Here, the information UI 1325 for the selected device A (200-A) may include prediction information about the operation progress state of the device A (200-A).

For example, the information UI 1325 for the device A (200-A) may include information (for example, automatic cleaning mode and completion rate (93%)) 1326 on an operation estimated to be performed by the device A (200-A) and map data 1327 indicating a location (for example, P(90,50)) estimated as a current location of the device A (200-A). Here, the map data 1327 may further include information (for example, information indicating a location of the device A (200-A) or information indicating that the device A (200-A) is located in a specific region 1328) on a location estimated as a current location of the device A (200-A). Further, the map data 1327 may further include information on an estimated moving route 1329 along which the device A (200A) moves. That is, the electronic apparatus 100 may visually display a location of the device A (200-A) that has lost a network connection or a moving route of the device A (200-A) that has lost a network connection through the information UI 1325.

To this end, the third artificial intelligence model 123 may be pre-trained by using, as training data, a route (for example, a location (20,80) of the device A (200-A) at 9 o'clock and 20 minutes, a location (20,75) of the device A (200-A) at 9 o'clock and 21 minutes, . . . , and the like) along which the device A (200-A) moves in the specific region 1328 within a predetermined time. The description of FIG. 6C may be applied here and thus an overlapping description thereof will be omitted.

Meanwhile, the device A (200-A) that has lost a network connection may obtain information regarding the operation progress state of the device during a time for which the network connection is lost.

Figure 14A:
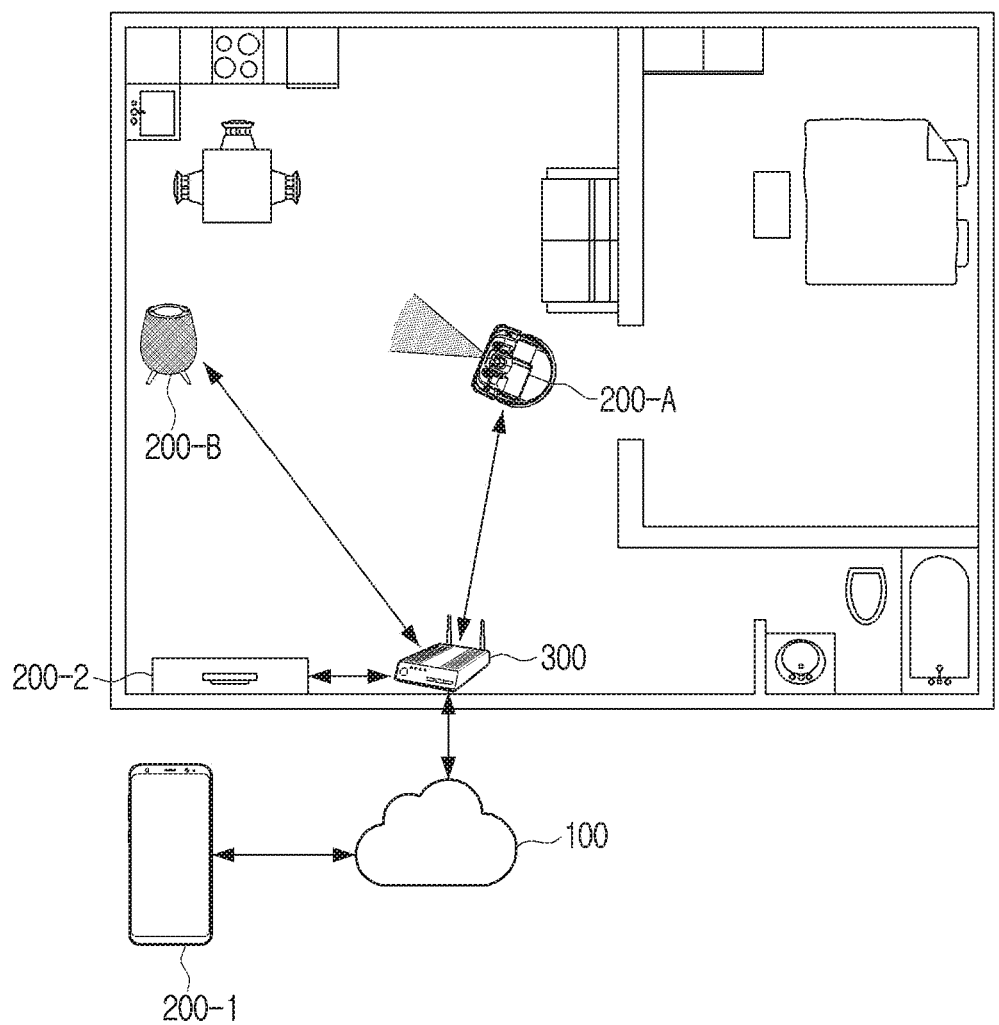
FIG. 14A is a diagram for describing a case where a network connection between an electronic apparatus and a device that has lost a network connection is resumed according to an embodiment of the disclosure.
Figure 14B:
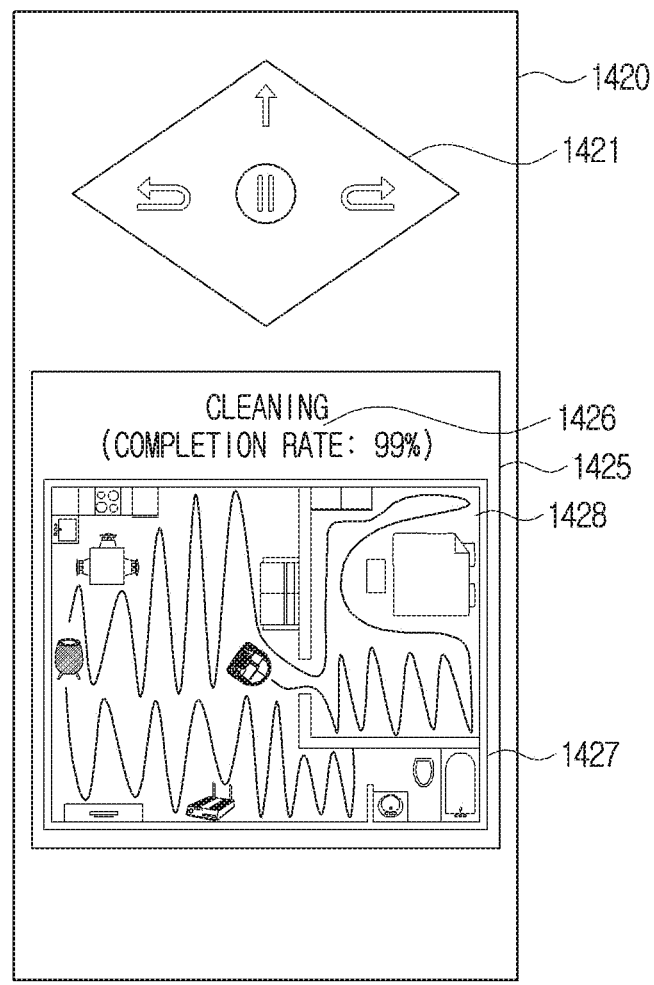
FIG. 14B is a diagram for describing a UI provided to a user according to an embodiment of the disclosure.

FIG. 14A is a diagram for describing a case where a network connection between an electronic apparatus and a device that has lost a network connection is resumed according to an embodiment of the disclosure. FIG. 14B is a diagram for describing a UI provided to a user according to an embodiment of the disclosure.

Referring to FIGS. 14A and 14B, after the device A (200-A) that has lost a network connection and obtained information regarding the operation progress state of the device, it is assumed that the device A (200-A) moves to a region in which a Wi-Fi connection to the bridge apparatus 300 is possible, and a connection between the device A (200-A) and the bridge apparatus 300 is resumed. This may mean that a network connection between the device A (200-A) and the electronic apparatus 100 is resumed.

In this case, the electronic apparatus 100 may receive the information regarding the operation progress state of the device A (200-A) from the device A (200-A) that has resumed (or re-established) a network connection after the loss of the network connection to the electronic apparatus 100, via the communication unit 110.

Referring to FIG. 14B, the electronic apparatus 100 may display the information received from the device A (200-A) that has resumed a network connection on the display. Further, the electronic apparatus 100 may control the device A (200-A) that has resumed a network connection.

For example, as illustrated in FIG. 14B, the electronic apparatus 100 may display a UI 1420 for the device A (200-A) on the display. Here, the UI 1420 for the device A (200-A) may include a control UI 1421 for controlling the device A (200-A) and an information UI 1425 for the device A (200-A). Here, the information UI 1425 for the device A (200-A) may include the information on the operation progress state of the device A (200-A) received from the device A (200-A).

For example, the information UI 1425 for the device A (200-A) may include information (for example, automatic cleaning mode) 1426 on an operation performed by the device A (200-A) and map data 1427 indicating a current location (for example, P(60,50)) of the device A (200-A). Here, the map data 1427 may include information on the device A (200-A) in a specific region 1428 during a time for which the network connection is lost.

As such, the electronic apparatus 100 may receive information that is not able to be received during a time for which the network connection of the device A (200-A) is lost, after the device A (200-A) resumes a network connection, and then perform an update.

Meanwhile, a description will be provided below under the assumption that the third artificial intelligence model 123 is not pre-trained in the embodiment of FIGS. 12A to 14B.

Here, in case that a network connection of the device A (200-A) illustrated in FIG. 13A is lost, the electronic apparatus 100 may not provide prediction information about an operation progress state of the device A (200-A) that has lost a network connection, unlike FIG. 13B. In this case, the device A (200-A) may obtain information regarding the operation progress state of the device during the loss of the network connection and store the obtained information in a memory of the device A (200-A), and in response to a network connection between the device A (200-A) and the electronic apparatus 100 being resumed later, the device A (200-A) may transmit the information regarding the operation progress state of the device A (200-A) stored in the memory to the electronic apparatus 100.

Further, the electronic apparatus 100 may train the third artificial intelligence model 123 by using, as training data, the information regarding the operation progress state of the device A (200-A) received from the device A (200-A). Here, once the network connection of the device A (200-A) illustrated in FIG. 13A is lost, the electronic apparatus 100 may input information (for example, information on the device A (200-A) and the environment information) received from the device A (200-A) before the network connection of the device A (200-A) is lost as illustrated in FIG. 13B to the third artificial intelligence model 123, and provide, to the user, prediction information about the operation progress state of the device A (200-A) based on an output of the third artificial intelligence model 123. Meanwhile, although the case that a UI (or information included in a UI) is displayed on the electronic apparatus 100 has been described above, but various modifications such as a modification in which the electronic apparatus 100 serves to store information included in a UI and transmit the information to one of the plurality of device 200-A to 200B and the one of the plurality of devices 200-1 to 200-B serves to display the received information (or UI) are possible.

Figure 15:
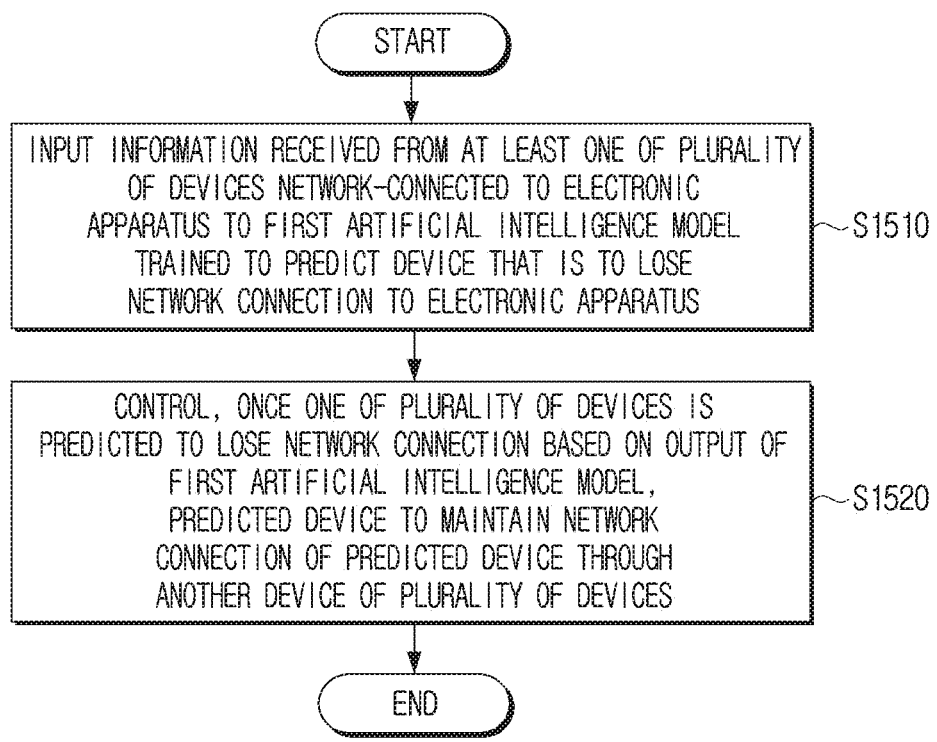
FIG. 15 is a flowchart for describing a control method of an electronic apparatus according to an embodiment of the disclosure.

FIG. 15 is a flowchart for describing a control method of an electronic apparatus according to an embodiment of the disclosure. The above description of the electronic apparatus 100 may be equally applied to each operation of the control method.

A control method of an electronic apparatus according to an embodiment of the disclosure includes: inputting information received from at least one of a plurality of devices network-connected to the electronic apparatus to a first artificial intelligence model trained to predict a device that is to lose a network connection to the electronic apparatus at operation S1510; and controlling, once one of the plurality of devices is predicted to lose a network connection based on an output of the first artificial intelligence model, the predicted device to maintain the network connection of the predicted device through another device of the plurality of devices at operation S1520.

Here, the first artificial intelligence model may be a model trained based on training data including information on a device that has lost a network connection to the electronic apparatus among the plurality of devices network-connected to the electronic apparatus, and information on the plurality of devices obtained during a time including a point in time at which the network connection is lost.

Meanwhile, a communication method between the plurality of devices and the electronic apparatus may be different from a communication method between the predicted device and the other device.

Meanwhile, the information on each of the plurality of devices may include at least one of an operation progress state of each device, information regarding a network connection of each device, or information regarding a surrounding environment of each device.

Meanwhile, the controlling may include transmitting, to the predicted device, a control signal for controlling the predicted device to transmit information obtained by the predicted device to the other device, and transmitting, to the other device, a control signal for controlling the other device to transmit the information received from the predicted device to the electronic apparatus.

Here, the controlling may include receiving, once the network connection between the predicted device and the electronic apparatus is lost, the information obtained by the predicted device from the other device.

Meanwhile, the controlling may include inputting the received information on each device to a second artificial intelligence model trained to identify another device of the plurality of devices network-connected to the electronic apparatus, and identifying another device based on an output of the second artificial intelligence model 122.

Here, the second artificial intelligence model may be a model trained based on training data including information on a state of communication for a network connection between the predicted device and at least one device located around the predicted device among the plurality of devices, and information on the plurality of devices obtained during a time including a point in time at which the network connection is established.

Meanwhile, the control method according to the disclosure may further include: inputting, in case that another device is not identified, information regarding a current operation progress state of the predicted device to a third artificial intelligence model trained to predict an operation progress state of each of the plurality of devices to obtain prediction information about a future operation progress state of the predicted device; and transmitting the obtained prediction information to at least one of the plurality of devices.

Here, the control method according to the disclosure may further include receiving, once a network connection between the predicted device and the electronic apparatus is lost and then resumed (or re-established), information regarding an operation progress state of the predicted device during a time for which the network connection is lost, from the predicted device; and training the third artificial intelligence model based on the received information.

Figure 16:
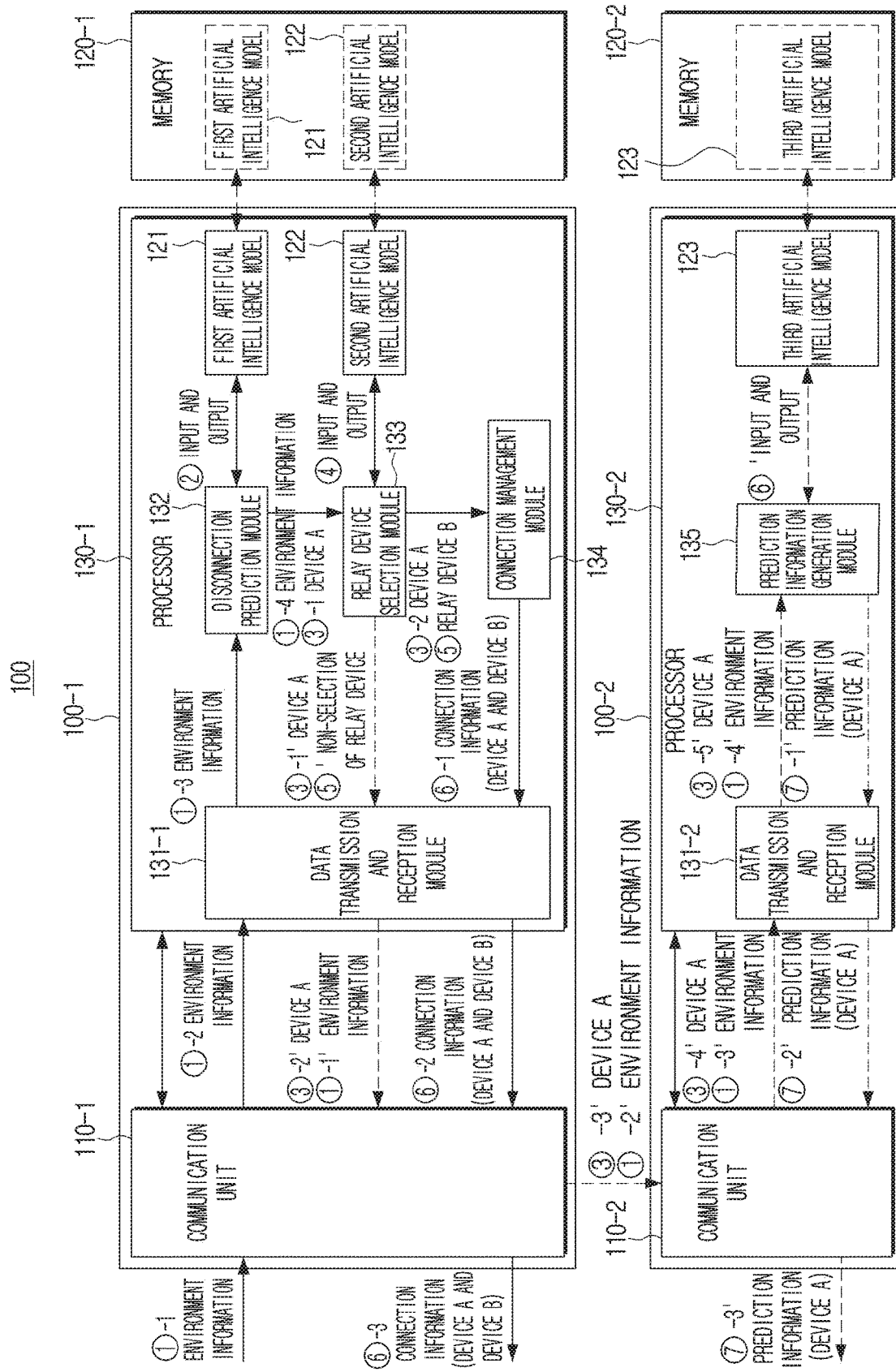
FIG. 16 is a view for describing a case where an electronic apparatus is implemented by a system according to an embodiment of the disclosure.

FIG. 16 is a view for describing a case where an electronic apparatus is implemented by a system according to an embodiment of the disclosure.

The electronic apparatus 100 may be implemented by a server system. Here, the server system may include a plurality of electronic apparatuses. In this case, the above-described operation of the electronic apparatus 100 may be split up among the plurality of electronic apparatuses. Hereinafter, a server system including a first electronic apparatus 100-1 and a second electronic apparatus 100-2 is assumed for convenience of explanation.

Referring to FIG. 16, the electronic apparatus 100 may include the first electronic apparatus 100-1 and the second electronic apparatus 100-2. The first electronic apparatus 100-1 and the second electronic apparatus 100-2 may be network-connected through a first communication unit 110-1 and a second communication unit 110-2, respectively. Here, the network connection may be established through a wired or wireless communication method and a description thereof has been provided above, and thus an overlapping description will be omitted.

The first electronic apparatus 100-1 may include the first communication unit 110-1, a first memory 120-1, and a first processor 130-1. Further, the second electronic apparatus 100-2 may include the second communication unit 110-2, a second memory 120-2, and a second processor 130-2. Here, the description of the communication unit 110 may be applied to the first communication unit 110-1 and the second communication unit 110-2, the description of the memory 120 may be applied to the first memory 120-1 and the second memory 120-2, and the description of the processor 130 may be applied to the first processor 130-1 and the second processor 130-2, and thus an overlapping description will be omitted.

Meanwhile, FIG. 16 illustrates a state in which each module is loaded (or executed) by each of the first and second processors 130-1 and 130-2 and operated in each of the first and second processors 130-1 and 130-2, and each module may be stored in the first memory 120-1 or the second memory 120-2. Further, the first artificial intelligence model 121 and the second artificial intelligence model 122 may be stored in the first memory 120-1 and the third artificial intelligence model 123 may be stored in the second memory 120-2.

The first processor 130-1 of the first electronic apparatus 100-1 may receive information (for example, environment information) from the plurality of devices 200 via the first communication unit 110-1 through a first data transmission and reception module 131-1 (①-1 and ①-2 of FIG. 16).

Further, the first processor 130-1 of the first electronic apparatus 100-1 may load the first artificial intelligence model 121 stored in the first memory 120-1, input the information (for example, environment information) received through a first data transmission and reception module 131-1 to the first artificial intelligence model 121, and identify a device (for example, the device A (200-A)) predicted to lose a network connection among the plurality of devices 200 based on an output of the first artificial intelligence model 121, through the disconnection prediction module 132 (①-3 and ② of FIG. 16).

Further, in case that the device (for example, the device A (200-A)) predicted to lose a network connection is identified through the disconnection prediction module 132, the first processor 130-1 may receive information on the device (for example, the device A (200-A) predicted to lose a network connection and environment information from the disconnection prediction module 132 (①-4 and ③-1 of FIG. 16), load the second artificial intelligence model 122 stored in the first memory 120-1, and input the information (the information on the predicted device and the environment information) received from the disconnection prediction module 132 or through the first data transmission module and reception module 131-1 to the second artificial intelligence model 122, through the relay device selection module 133 (④ of FIG. 16).

Further, the first processor 130-1 may select (or identify) another device (for example, the device B (200-B)) for maintaining the network connection of the predicted device A (200-A) among the plurality of devices 200 through the relay device selection module 133.

According to an embodiment, in case that another device (relay device) of the plurality of devices 200 is selected through the relay device selection module 133 (③-2 and ⑤ of FIG. 16), the first processor 130-1 may control the first communication unit 110-1 to transmit, to the predicted device (for example, the device A (200-A)) and the selected device B (200-B), connection information for a network connection between the predicted device A (200-A) and the selected device B (200-B) through the connection management module 134 and the first data transmission and reception module 131-1 (⑥-1, ⑥-2, and ⑥-3 of FIG. 16).

According to another embodiment, in case that another device (relay device) of the plurality of devices 200 is not selected through the relay device selection module 133 (③-1' and ⑤' of FIG. 16), the first processor 130-1 may control the first communication unit 110-1 to transmit, to the second electronic apparatus 100-2, the information on the device A (200-A) predicted to lose a network connection among the plurality of devices 200 and the environment information through the first data transmission and reception module 131-1 (③-2' and ①-1' of FIG. 16). Here, the transmitted environment information may include environment information of the device A (200-A).

In this case, the second processor 130-2 of the second electronic apparatus 100-2 may receive the information on the device A (200-A) predicted to lose a network connection and the environment information via the second communication unit 110-2 through a second data transmission and reception module 131-2 (③-3', ①-2', ③-4' and ①-3' of FIG. 16).

Further, the second processor 130-2 of the second electronic apparatus 100-2 may load the third artificial intelligence model 123 stored in the second memory 120-2 and input the information on the device A (200-A) predicted to lose a network connection and the environment information to the third artificial intelligence model 123 through the prediction information generation module 135 (⑥' of FIG. 16). Further, the second processor 130-2 may obtain prediction information about an operation progress state of the predicted device A (200-A) based on an output of the third artificial intelligence model 123 through the prediction information generation module 135 (⑥ of FIG. 16), and provide the prediction information to the user by controlling the second communication unit 110-2 to transmit the prediction information to at least one of the plurality of devices 200 through the second data transmission and reception module 131-2 (⑦-1', ⑦-2' and ⑦-3' of FIG. 16).

Meanwhile, the first and second electronic apparatuses 100-1 and 100-2 may be implemented by an electronic apparatus separate from the plurality of devices 200 and at least one electronic apparatus (or device) of the plurality of devices 200, respectively. According to an embodiment, the first electronic apparatus 100-1 may be implemented by a server, and the second electronic apparatus 100-2 may be implemented by an AI speaker which is one of the plurality of devices 200. Alternatively, according to another embodiment, the first electronic apparatus 100-1 may be implemented by a first server (for example, a cloud server), and the second electronic apparatus 100-2 may be implemented by a second server (for example, an artificial intelligence model server). Meanwhile, this is only an example, and the number and configurations of electronic apparatuses configuring the system may be variously changed.

Figure 17A:
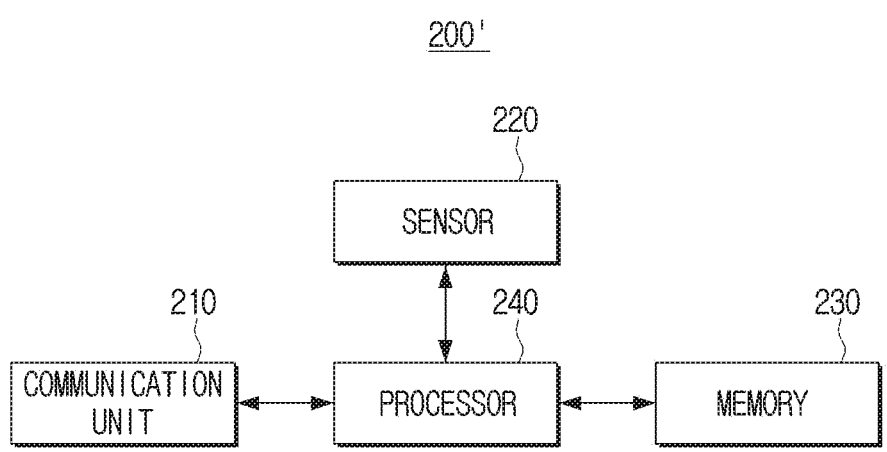
FIG. 17A is a block diagram for describing hardware components of a device according to an embodiment of the disclosure.
Figure 17B:
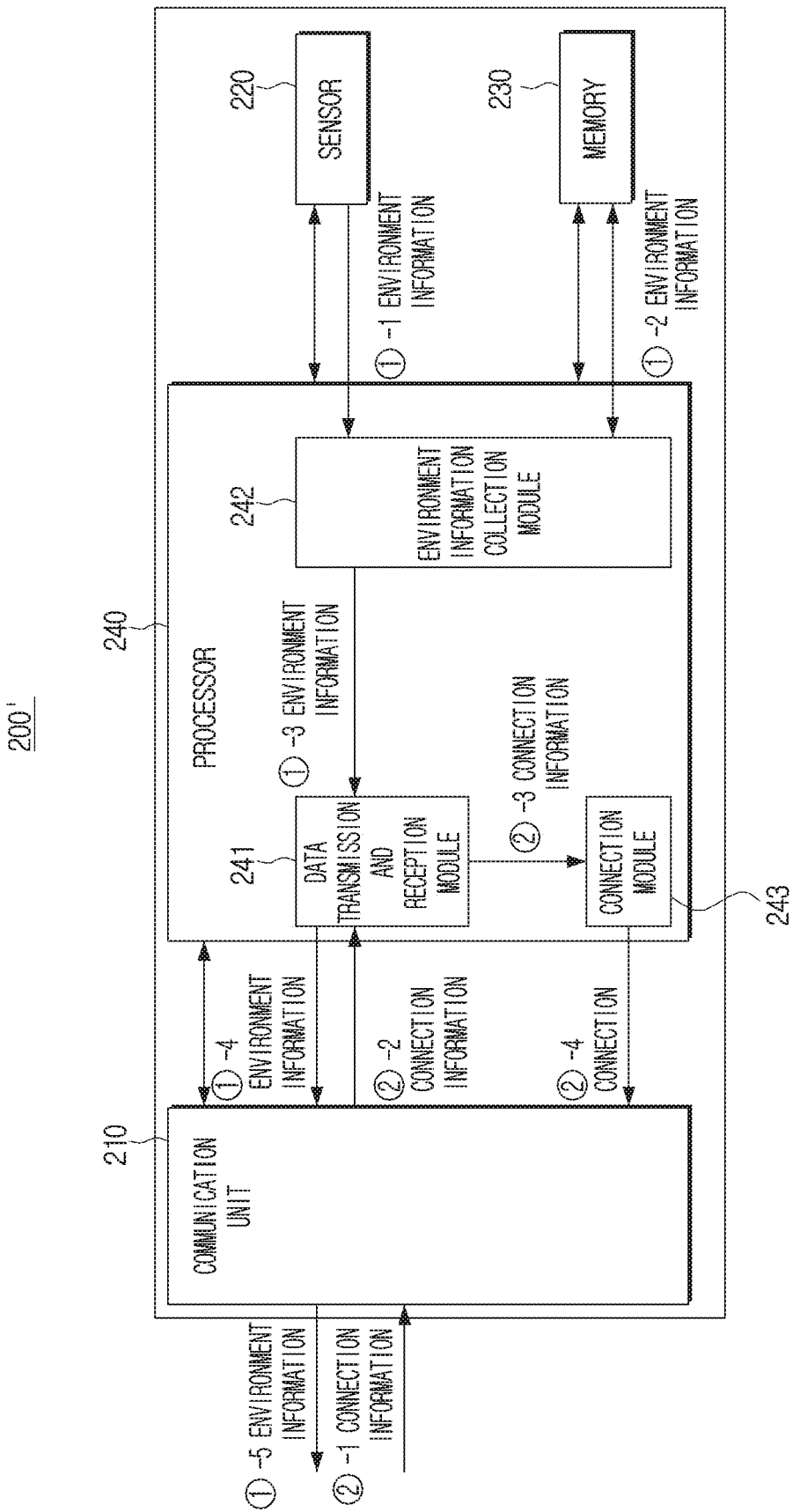
FIG. 17B is a block diagram for describing software components of an electronic device according to an embodiment of the disclosure.

FIG. 17A is a block diagram for describing hardware components of a device according to an embodiment of the disclosure. FIG. 17B is a block diagram for describing software components of the device according to an embodiment of the disclosure.

Referring to FIG. 17B, illustrated is a state in which a plurality of modules are loaded (or executed) by a processor 240 and operated in the processor 240, and the plurality of modules may be stored in a memory 230.

As described above, each of the plurality of devices 200 may have various configurations depending on its application. Hereinafter, however, a device 200' included in the plurality of devices 200 according to an embodiment of the disclosure will be described with reference to FIGS. 17A and 17B.

Referring to FIG. 17A, the device 200' may include a communication unit 210, a sensor 220, the memory 230, and the processor 240.

The communication unit 210 may refer to a hardware component that may perform communication with the electronic apparatus 100 to transmit and receive various information (or data), and unless otherwise noted, the description of the communication unit 110 of the electronic apparatus 100 may be equally applied to the communication unit 210, and thus a detailed description thereof will be omitted.

The sensor 220 may refer to a hardware component that may obtain internal environment information or external environment information (hereinafter, referred to as environment information of the device 200') of the device 200'.

The sensor 220 may include at least one of a time of flight (TOF) sensor (not illustrated), a heat sensor (not illustrated), a camera (not illustrated), a motion sensor (not illustrated), a global positioning system (GPS) (not illustrated), an illuminance sensor (not illustrated), or a communication sensor (not illustrated).

The TOF sensor may measure a distance from (or a location of) an object and a size of the object by radiating a pulse, receiving a signal returning after being reflected by the object, and measuring a strength of the signal, time, an absorption differential depending on a wavelength, wavelength shift, and the like. Here, various types of pulses such as laser, ultrasonic waves, and infrared ray (IR) may be used.

The heat sensor may sense a temperature of the object or a temperature (for example, indoor temperature) of a surrounding environment based on thermal radiation (or photons). Here, the heat sensor may be implemented by an infrared camera or the like. The camera may obtain an image by capturing a surrounding environment of the device 200'. In this case, an image processor (not illustrated) included in the camera or the processor 240 may analyze the image by using various image analysis algorithms to sense the surrounding environment of the device 200'. The motion sensor may sense a moving distance, a moving direction, an inclination, or the like, of the device 200'. To this end, the motion sensor may be implemented by a combination of an acceleration sensor, a gyro sensor, a geomagnetic sensor, and the like. The illuminance sensor may sense a light intensity (or brightness) of the surrounding environment. The communication sensor may sense at least one of a RSSI of a radio signal received via the communication unit 210, a communication method (for example, Bluetooth or NFC) for a network connection to a device located around the device 200' among the plurality of devices 200, a receiving sensitivity level, or a frequency band. To this end, the communication sensor may be implemented by a circuit for sensing a radio signal according to various communication methods such as NFC, Wi-Fi, Bluetooth, LTE, and 5G.

Meanwhile, the environment information of the device 200' may also be obtained by the processor 240. For example, the processor 240 may obtain information on an operation performed by the device 200', a completion rate (for example, percentage) of the operation, a time for which the operation is performed, a time at which the operation starts, a time at which the operation is to be completed, and the like. Further, the environment information of the device 200' may also be pre-stored in the memory 230. For example, identification information (for example, a device name, a model number, a serial number, or an IMEI) of each device, a network address (for example, a MAC address or an IP address) of each device, a communication method performable by each device, and the like, may be pre-stored in the memory 230.

The memory 230 may refer to a hardware component storing data or information in an electric form or a magnetic form to allow the processor 240 or the like to access, and unless otherwise noted, the description of the memory 120 of the electronic apparatus 100 may be equally applied to the memory 230, and thus a detailed description thereof will be omitted.

The processor 240 may control overall operation of the device 200'.

The processor 240 may obtain the environment information of the device 200'. For example, the processor 240 may periodically obtain the environment information of the device 200' every predetermined time through the sensor 220. Alternatively, the processor 240 may process (for example, calculation of a time remaining until the operation in progress is completed) data to obtain the environment information of the device 200'.

In this case, the processor 240 may control the communication unit 210 to transmit the environment information of the device 200' to the electronic apparatus 100.

Meanwhile, the processor 240 may be controlled by the electronic apparatus 100. Specifically, once a control command is received from the electronic apparatus 100 via the communication unit 210, the processor 240 may perform an operation corresponding to the control command Here, the operation corresponding to the control command may be different for each type of device 200'. For example, in case that the device 200' is a microwave oven, the operation corresponding to the control command may be a cooking mode, a defrost mode, an energy-saving mode, or the like, and in case that the device 200' is a robotic vacuum cleaner, the operation corresponding to the control command may be automatic cleaning, section cleaning, an energy-saving mode, or the like.

Meanwhile, once connection information is received from the electronic apparatus 100 via the communication unit 210, the processor 240 may control the communication unit 210 to maintain a network connection to the electronic apparatus 100 through another device (relay device) of the plurality of devices 200 based on the connection information.

Here, the connection information is information required for the device 200' to be network-connected to the other device of the plurality of devices 200, and may include a network address (for example, an MAC address or an IP address) of the other device to be network-connected, a communication method (for example, Wi-Fi, Bluetooth, ZigBee, or NFC) for the network connection, and the like. Meanwhile, the other device included in the connection information may be a plurality of devices. In this case, a priority may be set for each of the plurality of devices in advance, and the processor 240 may control the communication unit 210 to establish a network connection to the plurality of devices in an order according to the priority.

Meanwhile, the processor 240 may periodically obtain the environment information of the device 200' every predetermined time during the loss of the network connection to the electronic apparatus 100 and store the obtained environment information in the memory 230. Then, once the network connection to the electronic apparatus 100 is resumed, the processor 240 may control the communication unit 210 to transmit the environment information of the device 200' stored in the memory 230 to the electronic apparatus 100.

Referring to FIG. 17B, the processor 240 may access environment information periodically obtained by the sensor 220 and store the environment information in the memory 230 through an environment information collection module 242 (①-1 and ①-2 of FIG. 17B).

Meanwhile, this is only an example, and the processor 240 may access the environment information periodically obtained by the sensor 220 and transfer the environment information to a data transmission and reception module 241 through the environment information collection module 242 without storing the environment information in the memory 230.

Further, the processor 240 may transfer the environment information collected through the environment information collection module 242 to the data transmission and reception module 241 (①-3 of FIG. 17B) and control the communication unit 210 to transmit the environment information to the electronic apparatus 100 through the data transmission and reception module 241 (①-4 and ①-5 of FIG. 17B).

Meanwhile, the processor 240 may store the environment information of the device 200' in the memory 230 during the loss of the network connection to the electronic apparatus 100 through the environment information collection module 242. Then, once the network connection to the electronic apparatus 100 is resumed, the processor 240 may control the communication unit 210 to transmit the environment information of the device 200' stored in the memory 230 to the electronic apparatus 100 through the data transmission and reception module 241.

Meanwhile, the processor 240 may receive connection information from the electronic apparatus 100 via the communication unit 210 through the data transmission and reception module 241 (②-1 and ②-2 of FIG. 17B).

Further, the processor 240 may control the communication unit 210 to establish a network connection to a device (for example, the device B (200-B)) corresponding to information on a device included in the connection information received through the data transmission and reception module 241 according to a communication method included in the connection information, through a connection module 243 (②-3 and ②-4 of FIG. 17B). Here, in case that another device specified in the connection information is a plurality of devices, the processor 240 may control the communication unit 210 to establish a network connection to the plurality of devices in an order according to a priority set for each of the plurality of devices.

Further, the processor 240 may transfer the environment information (for example, an operation progress state) obtained through the environment information collection module 242 to the data transmission and reception module 241 and control the communication unit 210 to transmit the environment information to the device B (200-B) through the data transmission and reception module 241.

Various embodiments of the disclosure may be implemented by software including instructions stored in a machine-readable storage medium (for example, a computer-readable storage medium). A machine may be a device that invokes the stored instruction from the storage medium and may be operated depending on the invoked instruction, and may include an electronic apparatus (for example, the electronic apparatus 100) according to the disclosed embodiments. In the case where an instruction is executed by the processor, the processor may directly perform a function corresponding to the instruction or other components may perform the function corresponding to the instruction under a control of the processor. The instruction may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored on the storage medium.

The methods according to the various embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In the case of the online distribution, at least portions of the computer program product may be at least temporarily stored in a storage medium such as a memory of a server of a manufacturer, a server of an application store, or a relay server or be temporarily created.

In addition, each of components (for example, modules or programs) according to the diverse embodiments described above may include a single entity or a plurality of entities, and some of the sub-components described above may be omitted or other sub-components may be further included in the diverse embodiments. Alternatively or additionally, some of the components (for example, the modules or the programs) may be integrated into one entity, and may perform functions performed by the respective components before being integrated in the same or similar manner Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a transceiver;
a memory configured to store a first artificial intelligence (AI) model; and
a processor configured to:
based on environment information being received from at least one of a plurality of devices that are connected to the electronic apparatus, input the environment information to the first AI model, and
in response to one of the plurality of devices being predicted to lose a network connection based on an output of the first AI model, maintain the network connection of the predicted device through another device of the plurality of devices,
wherein the processor is further configured to:
control the transceiver to transmit, to the device predicted to lose the network connection, a control signal for controlling the device predicted to lose the network connection to transmit information obtained by the device predicted to lose the network connection to the other device,
control the transceiver to transmit, to the other device, a control signal for controlling the other device to transmit the information received from the device predicted to lose the network connection to the electronic apparatus, and
receive, in response to the network connection between the device predicted to lose the network connection and the electronic apparatus being lost, the information obtained by the device predicted to lose the network connection from the other device via the transceiver.

2. The electronic apparatus of claim 1,
wherein the first AI model is trained based on training data including information of a device that has lost a network connection to the electronic apparatus among the plurality of devices, and
wherein information of the plurality of devices is obtained during a time including a point in time at which the network connection is lost.

3. The electronic apparatus of claim 1,
wherein the memory further stores a second AI model, and
wherein the processor is further configured to identify the other device based on the second AI model and the environment information.

4. The electronic apparatus of claim 3,
wherein the second AI model is trained based on training data including network connection information indicating a state of a network connection between the device predicted to lose the network connection and at least one device among the plurality of devices located near the device predicted to lose the network connection, and
wherein information of the plurality of devices is obtained during a time including a point in time at which the network connection is established.

5. The electronic apparatus of claim 1,
wherein the memory is further configured to store a third AI model, and
wherein the processor is further configured to:
in case that the other device is not identified, determine prediction information on a future operation progress state of the device predicted to lose the network connection based on the third AI model and a current operation progress state of the device predicted to lose the network connection, and
control the transceiver to transmit the prediction information to at least one of the plurality of devices.

6. The electronic apparatus of claim 5, wherein the processor is further configured to:
in response to the network connection between the device predicted to lose the network connection and the electronic apparatus being lost and then resumed, receive state information of an operation progress state of the predicted device during a time for which the network connection is lost, from the predicted device via the transceiver, and
train the third AI model based on the state information.

7. The electronic apparatus of claim 1, wherein a communication method between the plurality of devices and the electronic apparatus is different from a communication method between the device predicted to lose the network connection and the other device.

8. The electronic apparatus of claim 1, wherein the environment information comprises at least one of information of an operation progress state of each device, information of a network connection of each device, or information of a surrounding environment of each device.

9. A method of an electronic apparatus, the method comprising:
based on environment information being received from at least one of a plurality of devices that are connected to the electronic apparatus, inputting the environment information to a first artificial intelligence (AI) model; and
in response to one of the plurality of devices being predicted to lose a network connection based on an output of the first AI model, controlling the device predicted to lose the network connection to maintain the network connection of the device predicted to lose the network connection through another device of the plurality of devices,
wherein the controlling of the predicted device comprises:
transmitting, to the device predicted to lose the network connection, a control signal for controlling the device predicted to lose the network connection to transmit information obtained by the device predicted to lose the network connection to the other device,
transmitting, to the other device, a control signal for controlling the other device to transmit the information received from the device predicted to lose the network connection to the electronic apparatus, and
receiving, in response to the network connection between the device predicted to lose the network connection and the electronic apparatus being lost, the information obtained by the device predicted to lose the network connection from the other device.

10. The method of claim 9,
wherein the first AI model is trained based on training data including information of a device that has lost a network connection to the electronic apparatus among the plurality of devices, and
wherein information of the plurality of devices is obtained during a time including a point in time at which the network connection is lost.

11. The method of claim 9, wherein the controlling of the predicted device comprises:
inputting the received environment information to a second AI model trained to identify the other device of the plurality of devices network-connected to the electronic apparatus; and
identifying the other device based on an output of the second AI model.

12. The method of claim 11,
wherein the second AI model is trained based on training data including network connection information indicating a state of a network connection between the predicted device and at least one device located near the device predicted to lose the network connection, and
wherein information of the plurality of devices is obtained during a time including a point in time at which the network connection is established.

13. The method of claim 9, further comprising:
in case that the other device is not identified, inputting operation progress state information on a current operation progress state of the predicted device to a third AI model;
obtaining prediction information on a future operation progress state of the device predicted to lose the network connection based on an output of the third AI model; and
transmitting the prediction information to at least one of the plurality of devices.

14. The method of claim 13, further comprising:
in response to the network connection between the device predicted to lose the network connection and the electronic apparatus being lost and then resumed, receiving state information of an operation progress state of the device predicted to lose the network connection during a time for which the network connection is lost, from the device predicted to lose the network connection; and
training the third AI model based on the state information.

15. The method of claim 9, wherein a communication method between the plurality of devices and the electronic apparatus is different from a communication method between the device predicted to lose the network connection and the other device.

16. The method of claim 9, wherein the environment information comprises at least one of information of an operation progress state of each device, information of a network connection of each device, or information of a surrounding environment of each device.

17. The method of claim 9, further comprising:
combining the environment information and training data based on a network connection to a first device of the plurality of devices being lost; and
training the first AI model to determine that the first device will lose the network connection using the combined training data.

18. The method of claim 9, further comprising:
setting a priority for each of the plurality of devices based on corresponding environment information;
identifying a weight for each of the plurality of devices based on a primary function of each corresponding device; and
selecting the other device based on the priority of the other device and the weight for the other device.

19. The method of claim 9,
wherein a first device transmits environment information of the first device using a first communication method, and
wherein a second device transmits environment information of the second device using a second communication method that is different from the first communication method.

20. The method of claim 9, further comprising:
determining the device predicted to lose the network connection will lose the network connection; and
retraining the first AI model based on the device predicted to lose the network connection not losing the network connection.

* * * * *